United States Patent
Namba et al.

(10) Patent No.: US 8,596,796 B2
(45) Date of Patent: Dec. 3, 2013

(54) PROJECTION DISPLAY DEVICE WITH A COOLING AIR FAN

(75) Inventors: Shu Namba, Osaka (JP); Shigekazu Yamagishi, Osaka (JP); Yoshimasa Fushimi, Osaka (JP); Naoko Yamashita, Hyogo (JP)

(73) Assignee: Panasonic Corporation, Osaka (JP)

( * ) Notice: Subject to any disclaimer, the term of this patent is extended or adjusted under 35 U.S.C. 154(b) by 550 days.

(21) Appl. No.: 12/555,906

(22) Filed: Sep. 9, 2009

(65) Prior Publication Data

US 2010/0091252 A1    Apr. 15, 2010

(30) Foreign Application Priority Data

Sep. 9, 2008   (JP) .................................. 2008-230769
Sep. 26, 2008  (JP) .................................. 2008-247835

(51) Int. Cl.
*G03B 21/18*   (2006.01)

(52) U.S. Cl.
USPC ............................................................. 353/61

(58) Field of Classification Search
USPC ........... 353/52–61; 454/184; 137/43; 313/45, 313/46
See application file for complete search history.

(56) References Cited

U.S. PATENT DOCUMENTS

| | | | | |
|---|---|---|---|---|
| 2,109,512 | A * | 3/1938 | Stacey, Jr. ...................... | 237/2 R |
| 6,481,854 | B1 * | 11/2002 | Sugawara et al. ............... | 353/52 |
| 2007/0058373 | A1 | 3/2007 | Yoshimura et al. | |
| 2008/0218050 | A1 * | 9/2008 | Soma et al. ...................... | 313/35 |
| 2009/0027626 | A1 * | 1/2009 | Chang .............................. | 353/52 |

FOREIGN PATENT DOCUMENTS

| | | | |
|---|---|---|---|
| JP | 2002-298639 A | | 10/2002 |
| JP | 2005-024735 | | 1/2005 |
| JP | 2005010505 A | * | 1/2005 |
| JP | 2007-078736 A | | 3/2007 |

* cited by examiner

*Primary Examiner* — Thanh Luu
*Assistant Examiner* — Danell L Owens
(74) *Attorney, Agent, or Firm* — Hamre, Schumann, Mueller & Larson, P.C.

(57) ABSTRACT

A projection display device that includes: a light source unit 1 that includes a discharge lamp 2 as a light source; an image formation unit; a projection optical system; and a light source cooling unit that cools the light source unit. The light source unit is disposed so that a lamp axis that connects two discharge electrodes of the discharge lamp is orthogonal to a projecting direction of the projection optical system, and the light source unit includes: a concave mirror 3; and a transparent part 4 that covers an opening of the concave mirror. The light source cooling unit includes: a blowing fan that supplies cooling air; a plurality of air blowing ports 6a and 6b disposed at the concave mirror or a connecting part that connects the concave mirror and the transparent part; an air duct 9 that connects the air blowing ports and the blowing fan; a branch switching valve 10a that is disposed in the air duct and switches between a plurality of branch flow paths so as to allow the cooling air to flow therethrough; and a control valve that is provided for each of the air blowing ports and rotated around a supporting axis by the action of gravity depending on a posture of the light source cooling unit, thereby controlling a wind direction so that the cooling air is blown from above the discharge lamp. The top of the light source lamp is cooled effectively regardless of the installation posture of the projection display device.

20 Claims, 17 Drawing Sheets

PROJECTION DISPLAY DEVICE WITH A COOLING AIR FAN

BACKGROUND OF THE INVENTION

1. Field of the Invention

The present invention relates to a projection display device such as a projector that includes a cooling device for cooling an illuminant of a light source. More specifically, the present invention relates to a projection display device that always is capable of cooling a high-temperature portion of a light source lamp even in various installation postures.

2. Description of Related Art

Conventionally, a projection display device such as a projector includes a light source lamp that emits light for projecting and displaying an image displayed on a display device such as a liquid crystal panel. This light source lamp is filled with mercury, an inert gas, a metal halide, and the like.

In this projection display device, when a predetermined voltage is applied to electrodes of the light source lamp, a discharge arc occurs, and the gas filled in the light source lamp starts to be convected.

The discharge arc being carried by the convection is formed into an arch shape in a chevron pattern to approach the top of the light source lamp, which makes the temperature at the top of the light source lamp higher.

When the light source lamp has an excessively high temperature, problems such as whitening, a shortened life, and a rupture occur. To the contrary, when the light source lamp has an excessively low temperature, problems such as blacking and lower brightness of the light source occur.

In view of the above, various methods have been proposed for cooling the top of the light source lamp efficiently. Usually, cooling air is blown toward the vicinity of the top of the light source lamp. More specifically, ambient air that is drawn in for cooling from the outside of the device by a cooling fan is guided by a guiding means (air guide path) such as a duct, thereby cooling the top of a light bulb that reaches a high temperature.

Even when the projector is installed in a somewhat different posture depending on its projection condition, the light source should be held with its electrodes kept horizontal. For this reason, the light source is disposed so that a lamp axis that connects the two electrodes of the light source lamp is orthogonal to an optical axis of a projection lens. Accordingly, the electrodes are prevented from being raised or lowered due to a difference in the posture of the projector, and a stable light-emitting position is obtained, resulting in conformity with optical properties. However, the light source lamp is inverted depending on whether the projection display device is used in a floor-standing state or a ceiling-hung state.

For this reason, even with the configuration for cooling the top of the light source lamp efficiently, the projection display device is caused to cool predominantly at the bottom of the light source lamp depending on its installation posture, i.e., if the projection display device is turned upside down, resulting in an excessively low temperature at the bottom of the light source lamp.

Similarly, when the projection display device is used in a posture for projecting an image in a vertically upward direction, a posture for projecting an image in a vertically downward direction, or a posture therebetween, portions other than the top of the light source lamp are overcooled, which causes blacking and lower brightness of the light source.

In this case, the top, which needs to be cooled, in contrast is cooled insufficiently, which contributes to enhanced cooling. As a result, the above-described phenomena are worsened.

In order to solve this problem, JP 2002-298639 A, JP 2005-24735 A, and JP 2007-78736 A disclose a method in which an angle of a baffle plate is changed depending on an installation posture of a device, thereby cooling the top of a light source lamp efficiently, and a method in which a plurality of cooling air ducts are provided, so that an appropriate flow path is selected depending on an installation posture.

A light source device disclosed in JP 2002-298639 A above includes, in the vicinity of a side surface of a front opening of a concave mirror, a wind direction control plate for supplying much ambient air to the top or bottom of a light source, thereby cooling the top of the light source even if a projection display device is turned upside down.

However, since air is supplied from a lateral side direction, even if the light source lamp has an optimum temperature at its top and bottom, the temperature on both lateral sides of the light source lamp becomes higher or lower than that at its top and bottom.

Further, a light source device disclosed in JP 2005-24735 A includes cooling air inlet openings on top and bottom surfaces of a concave mirror. Each of the cooling air inlet openings is connected with a cooling air path. At an entrance of the cooling air path, a shutter that makes up-and-down movements under its own weight is provided.

However, it is necessary to form the air duct for cooling a light source at both the top and bottom of the concave mirror, which makes the device larger.

According to JP 2002-298639 A and JP 2005-24735 A, the light source lamp has an optimum temperature at its top even if the projection display device is turned upside down. However, when the projection display device is directed vertically upward or vertically downward to project an image, it is impossible to cool the top of the light source lamp.

Further, in a projector device disclosed in JP 2007-78736 A, two air inlets for introducing cooling air toward a light source lamp are formed on both lateral sides of a plane including a central axis of the light source lamp and orthogonal to a side wall of a concave mirror.

However, since cooling air is blown from one direction, the temperature on both lateral sides of the light source lamp becomes higher or lower than that at its top and bottom. Additionally, in a certain installation posture, the light source lamp is cooled excessively at its bottom.

SUMMARY OF THE INVENTION

The present invention is intended to solve the above problems, and it is an object of the present invention to provide a projection display device with a simple configuration that allows the top of a light source lamp to be cooled efficiently regardless of installation posture, prevents the bottom of the light source lamp from being overcooled, and allows both lateral sides of the light source lamp to be cooled at an optimum temperature.

A projection display device according to the present invention includes: a light source unit that includes a discharge lamp as a light source; an image formation unit; a projection optical system; and a light source cooling unit that cools the light source unit. The display device projects an image displayed on the image formation unit by using light emitted from the light source unit. The light source unit is disposed so that a lamp axis that connects two discharge electrodes of the discharge lamp is orthogonal to a projecting direction of the projection optical system, and the light source unit includes: a concave mirror whose central axis matches the lamp axis and that reflects the light emitted from the discharge lamp; and a transparent part that covers an opening of the concave mirror.

In order to solve the problems as described above, the light source cooling unit includes: a blowing fan that supplies cooling air; a plurality of air blowing ports disposed in a circumferential portion of the concave mirror or a connecting part that connects the concave mirror and the transparent part, at positions corresponding to directions in which they are orthogonal to each other with the lamp axis as a center; an air duct that connects the air blowing ports and the blowing fan; a branch switching valve that is disposed in the air duct and switches between a plurality of branch flow paths so as to allow the cooling air supplied by the blowing fan to flow therethrough; and a control valve that is provided for each of the air blowing ports and rotated around a supporting axis by the action of gravity depending on a posture of the light source cooling unit, thereby controlling a wind direction so that the cooling air is blown from above the discharge lamp.

With this configuration, due to the simple configuration of the air duct having the control valve that is rotated around a supporting axis by the action of gravity depending on a posture of the light source cooling unit, thereby controlling a cooling wind direction, it is possible to cool the top of the light source lamp efficiently, and prevent the bottom of the light source lamp from being overcooled regardless of the installation posture of the projection display device. Further, it is possible to cool both lateral sides of the light source lamp at an optimum temperature, and therefore, it is possible to achieve an excellent effect of preventing whitening, a shortened life, and a rupture as well as blacking and lower brightness of the light source.

Further, since only one fan is required to provide cooling regardless of installation posture, it is possible to reduce the size and cost of the projection display device, and further to reduce noise due to efficient cooling.

DETAILED DESCRIPTION OF THE INVENTION

Figure 1:
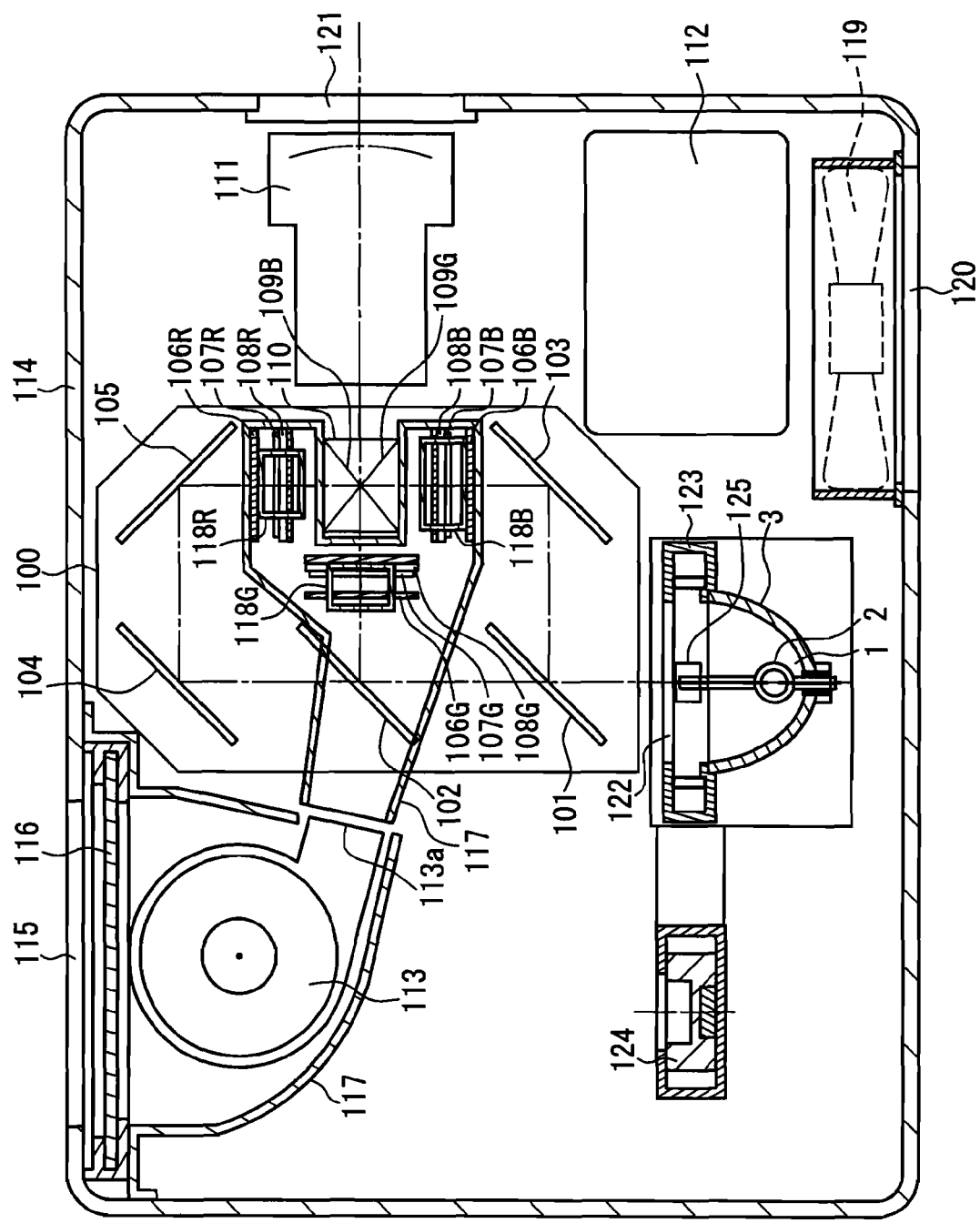
FIG. 1 is a view showing an entire configuration of a projection image display device according to embodiments of the present invention.

Based on the above configuration, the projection display device of the present invention may have the following aspects.

The control valve may be formed of an air control baffle that is rotatable around a rotation axis that extends in a direction orthogonal or parallel to the lamp axis.

Further, the air blowing ports may be disposed at least two positions. Further, an exhaust port may be provided at least one position substantially opposed to the air blowing ports.

Further, the air control baffle may have rotation stop positions in two directions depending on an installation posture of the projection display device. In this case, the rotation axis of the control valve may extend in a direction orthogonal to the lamp axis in the vicinity of the opening of the concave mirror, and one of the rotation stop positions of the air control baffle may be set so as to guide the cooling air toward a top of the light source lamp depending on the installation posture of the projection display device. Further, the air control baffle may be rotatable around the rotation axis by the action of gravity.

In this case, the branch switching valve may be rotated by the action of gravity to switch between the flow paths. Alternatively, a driving circuit that rotates the branch switching valve further may be included. The driving circuit may rotate the branch switching valve to switch between the flow paths based on information on an angle at which the projection display device is installed.

Further, the branch switching valve may be symmetrical with respect to a rotation axis and have a weight portion located at a position away from the rotation axis.

Further, the branch switching valve may be provided with respect to each of the flow paths leading to each of the air blowing ports.

Further, the air blowing ports may be disposed in the circumferential portion of the concave mirror or the connecting part at positions corresponding to at least four directions in which they are orthogonal to each other with the lamp axis as a center. The air duct may be divided into two branch flow paths, between which the branch switching valve switches so as to allow the cooling air supplied by the blowing fan to flow therethrough. The control valve may include first and second control valves disposed in the respective branch flow paths to be switched therebetween. The cooling air may be blown through one of the air blowing ports depending on the posture of the light source cooling unit.

Further, the air duct, in the downstream after being switched by the branch switching valve to one of the branch flow paths in two directions, may be formed so as to surround the concave mirror or the connecting part in a circumferential direction. Each of the branch flow paths may include at least two flow paths leading to the air blowing ports disposed in the circumferential direction, and at least one of the flow paths may be switched between a mode of blowing the cooling air and a mode of stopping the cooling air by the first control valve or the second control valve.

Further, the first control valve or the second control valve may be rotated around the supporting axis in the air duct by the action of gravity so that the cooling air is guided to the air blowing port that is located at the top, among the air blowing ports disposed in the circumferential direction of the concave mirror or the connecting part, when the projection display device is installed.

Further, the first control valve or the second control valve may have a configuration in which a shield plate is provided on both sides of the supporting axis such that the center of gravity is located to the air blowing port side relative to the supporting axis.

Further, the branch switching valve may be provided at a portion where the one air duct is divided into the two branch flow paths, and move in the air duct by the action of gravity to block or open one of the branch flow paths.

Further, the branch switching valve may have a columnar or spherical shape.

Further, the branch switching valve may be provided at a portion where the one air duct is divided into the two branch flow paths, and have a cantilever shape with a shield plate provided on one side of a supporting axis, so as to be rotated in the air duct by the action of gravity to block or open one of the branch flow paths.

Further, each of the air blowing ports may have an air guide plate that guides air toward the discharge lamp.

Further, the air blowing ports may be disposed in the circumferential portion of the concave mirror or the connecting part at positions corresponding to at least four directions in which they are orthogonal to each other with the lamp axis as a center. The air duct may be divided into two branch flow paths, and the branch switching valve may be formed of first and second branch switching valves, each being rotated around a supporting axis by the action of gravity to switch between the two branch flow paths so as to allow the cooling air supplied by the blowing fan to flow therethrough. The control valve may include first and second control valves disposed in the respective branch flow paths to be switched therebetween.

Further, the first and second branch switching valves may be provided at a portion where the one air duct is divided into the two branch flow paths, and disposed on the respective branch flow path sides with a rotation stopper provided therebetween, each having a cantilever shape with a shield plate provided on one side of a supporting axis, so as to be rotated in the air duct by the action of gravity to block or open the branch flow path where it is disposed.

Hereinafter, embodiments of the present invention will be described with reference to the drawings. First, an entire configuration of a projection image display device, which is common to the respective embodiments, including a light source cooling device in each embodiment will be described with reference to FIG. 1.

In FIG. 1, light emitted from a discharge lamp 2 of a light source unit 1 is reflected in a forward direction by a cylindrical concave mirror 3.

Light incident on an optical unit 100 passes through dichroic mirrors 101 and 102 and total reflection mirrors 103, 104, and 105 and is separated into red, green, and blue light. Thereafter, the color light intensity is modulated based on an input signal from the outside by incident-side polarizers 106R, 106G, and 106B, liquid crystal panels 107R, 107G, and 107B, and eject-side polarizers 108R, 108G, and 108B.

The resulting light is combined into one optical path by a combine prism 110 that includes dichroic reflective films 109R and 109B, and then enters a projection lens 111.

The projection lens 111 is designed and installed so as to enlarge and project an image formed on the liquid crystal panels 107R, 107G, and 107B onto a screen (not shown) disposed in front of the device.

A cooling system is required to ensure reliability since the device includes elements that generate large amounts of heat by themselves, such as a light bulb of the light source unit 1 that reaches a temperature as high as 1,000 degrees during illumination and a power supply 112 for driving the light source and displaying an image.

Thus, ambient air (relatively low-temperature air) that is drawn in by an air intake fan 113 as a blowing unit through an intake port 115 and a powder dust capture filter 116 provided on a side surface of a housing 114 is introduced into the device.

The air drawn into the device by the air intake fan 113 is guided toward an optical unit duct 117 disposed in close contact with a fan outlet 113a.

An aperture for blue channel 118B, an aperture for green channel 118G, and an aperture for red channel 118R are provided in the optical unit duct 117 at corresponding positions below the incident-side polarizers 106R, 106G, and 106B, the liquid crystal panels 107R, 107G, and 107B, and the eject-side polarizers 108R, 108G, and 108B.

Air blown out through these apertures removes heat away from the incident-side polarizers 106R, 106G, and 106B, the liquid crystal panels 107R, 107G, and 107B, and the eject-side polarizers 108R, 108G, and 108B, and then is drawn in by an exhaust fan 119. Through this process, the drawn-in air also removes heat away from the discharge lamp 2, components on its periphery, and the power supply 112.

Air that has reached the exhaust fan 119 passes through an exhaust port 120 provided on a side surface of the housing 114 to be blown out.

Conventionally, powder dust from the outside was drawn in along with the ambient air during the cooling process, and became attached to the periphery of the liquid crystal panels and the light source unit. As a result, failures such as premature deterioration of brightness and the occurrence of color irregularities in a projected image occurred.

In order to avoid this, the projection image display device employs a housing structure that does not allow the intake of powder dust and a powder dust capture structure. The projection lens 111 is contained completely in the housing and, at a light transmission unit, a window part 121 is attached to the housing with no clearance.

Accordingly, with the increased hermeticity of the housing 114, it is required to provide efficient cooling with a fan.

In particular, the projection image display device according to the present invention has an improved cooling structure for the periphery of the light source. To this end, a front glass 122 made of a transparent part is provided on the opening side of the concave mirror 3 of the light source unit 1, and an air duct 123 connected to the cylindrical concave mirror 3 is disposed therebetween. Air supplied by a light source fan 124 passes through air blowing ports 125 of the air duct 123 to cool the discharge lamp 2.

The air blowing ports 125 are disposed in a circumferential portion of the air duct 123 at positions corresponding to directions in which they are orthogonal to each other with a lamp axis as a center. Each of the air blowing ports 125 has an air guide plate (not shown) that guides air toward the discharge lamp 2. It should be noted that the circumferential portion of the air duct 123 is formed as a part of a circumferential portion of the concave mirror 3 or a connecting part that connects the concave mirror 3 and the front glass 122.

The following is a detailed description of the cooling structure for the periphery of the light source unit according to respective embodiments of the present invention.

Embodiment 1

Figure 2A:
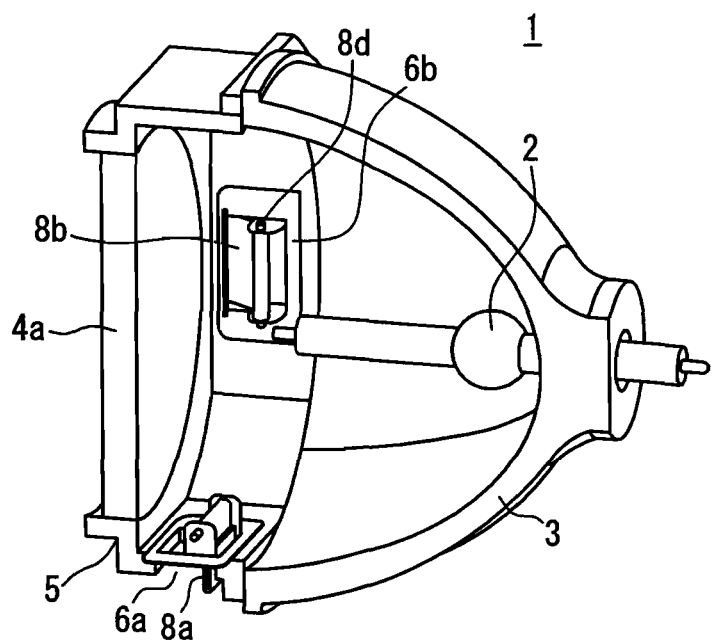
FIG. 2A is a perspective view showing in partially cross-section a schematic configuration of a light source unit included in a projection display device according to Embodiment 1 of the present invention.
Figure 2B:
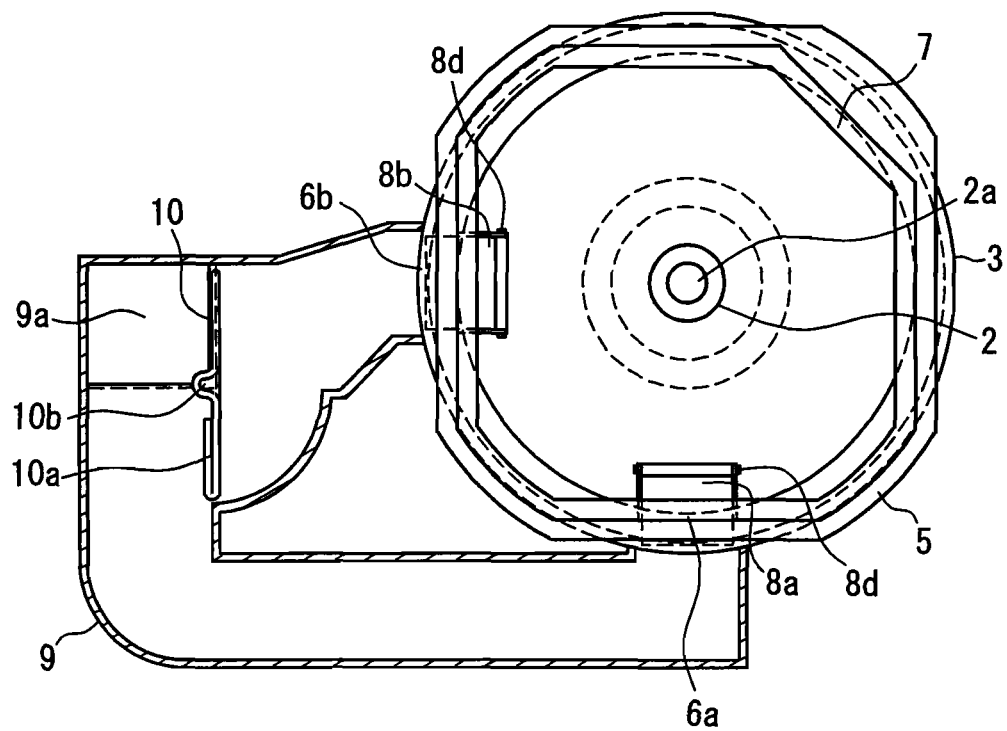
FIG. 2B is a front view showing in partially cross-section the schematic configuration of the same light source unit.
Figure 2C:
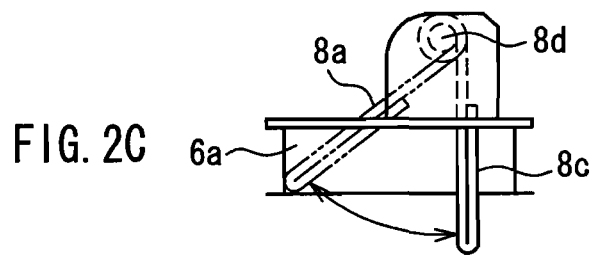
FIG. 2C is a view for explaining an operation of an air control baffle included in the same light source unit.

FIGS. 2A to 2C show a schematic configuration of a light source unit included in a projection display device according to Embodiment 1 of the present invention. Specifically, FIG. 2A is a cross-sectional perspective view, FIG. 2B is a front view showing a cross-section of an air duct provided at the light source unit, and FIG. 2C is a view for explaining an operation of an air control baffle. FIGS. 3A-3C to 6A-6C show relationships between an installation posture of the projection display device and a flow of cooling air. Specifically, FIGS. 3A to 6A are side views showing installation postures of the projection display device, FIGS. 3B to 6B are front views showing in partially cross-section the opening/closing of a valve in the respective installation postures, and FIGS. 3C to 6C are side cross-sectional views showing flows of cooling air in a lamp in the respective installation postures.

A light source unit 1 includes a light source lamp 2, a substantially cylindrical concave mirror 3 forming, for example, a spheroid that contains the light source lamp 2 and reflects light emitted from the light source lamp 2, a transparent glass part 4 that blocks a front opening of the concave mirror 3, and a connecting part 5 disposed between the concave mirror 3 and the glass part 4.

The connecting part 5 includes air blowing ports 6a and 6b and an exhaust port 7 (see FIG. 2B). The air blowing ports 6a and 6b are provided respectively with rotatable air control baffles 8a and 8b having rotation axes that are substantially perpendicular to an optical axis 2a of the light source lamp 2 and positioned in a projection space of the opening of the concave mirror. The air control baffles 8a and 8b each function as a control valve that controls a wind direction so that cooling air is blown from above the light source lamp 2. The air blowing ports 6a and 6b may be formed on a wall surface of the concave mirror 3.

As shown in FIG. 2B, the air blowing ports 6a and 6b are arranged in a substantially perpendicular direction with respect to each other with the optical axis 2a of the light source lamp 2 as a center. The exhaust port 7 has its opening at a position opposed to a middle point between the air blowing ports 6a and 6b with the optical axis 2a interposed therebetween. The exhaust port 7 is located at an equal distance from the air blowing ports 6a and 6b. The exhaust port 7 may be provided at each of positions opposed to the respective air blowing ports 6a and 6b.

As shown in FIG. 2C, the air control baffles 8a and 8b each have a weight portion 8c, and are rotated around a rotation axis 8d so that the weight portion 8c is always oriented downward.

As shown in FIG. 2B, each of the air blowing ports 6a and 6b is connected with an air duct 9 for guiding cooling air. The air duct 9 is provided with a branch switching valve 10 that switches a flow path and a flow rate depending on an installation posture of the projection display device, and a fan (not shown) is disposed at an entrance 9a of the air duct 9.

Similarly to the air control baffles 8a and 8b, the branch switching valve 10 also has a weight portion 10a, and is rotated around a supporting axis 10b vertical to the direction of gravity so that the weight portion 10a is always oriented downward.

Allow of cooling air is indicated by an arrow in FIGS. 3B to 6B and FIGS. 3C to 6C.

FIGS. 3A to 6A show variations of a position of a projection lens 11a in respective installation postures of a projection display device 11, and reference numeral 11b denotes an optical axis of the projection lens 11a. FIGS. 3A-6A as well as FIGS. 3B-6B are views seen from the same direction. It should be noted that in FIGS. 3B to 6B, the structure in the vicinity of the opening of the concave mirror 3 is simplified. As can be seen from the figures, the optical axis 11b of the projection lens 11a is orthogonal to the optical axis 2a of the light source lamp 2 (equivalent to a lamp axis connecting discharge electrodes of the lamp).

Namely, if the installation posture of the projection display device 11 varies as shown in FIGS. 3A to 6A, the air blowing ports 6a and 6b are displaced to other positions with the optical axis 2a as a center, while the optical axis 2a of the light source lamp 2 remains in the same direction.

Hereinafter, relationships between the installation posture of the projection display device 11 and the flow of cooling air will be described with reference to FIGS. 3A to 6C.

Figure 3A:
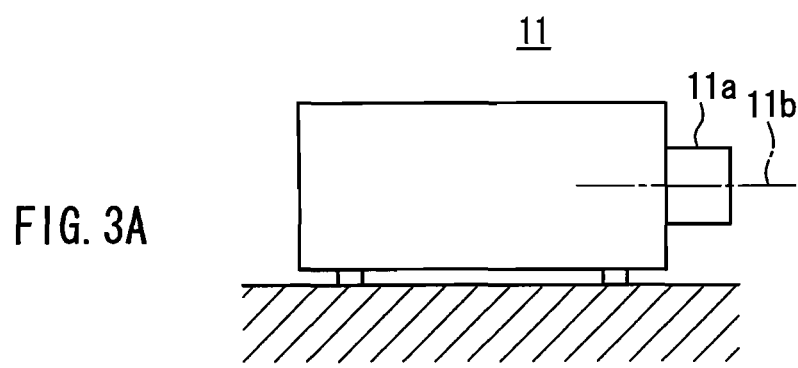
FIG. 3A is a side view showing a first installation posture of the projection display device according to Embodiment 1 of the present invention.
Figure 3B:
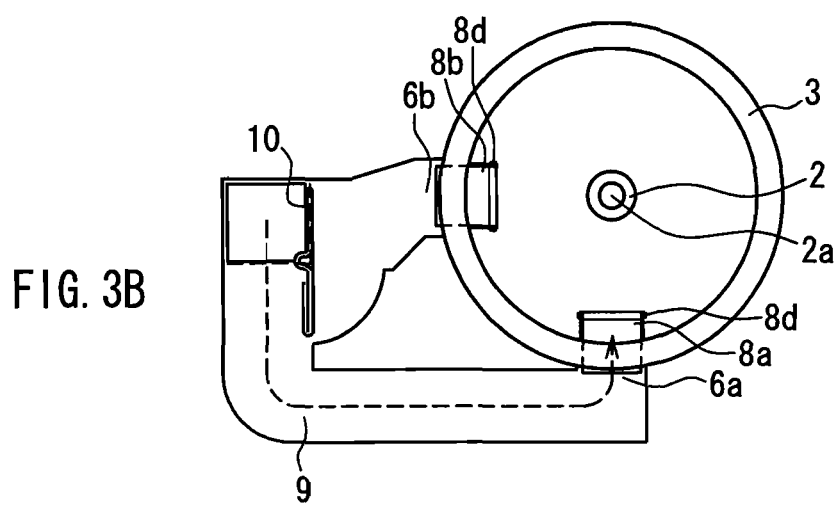
FIG. 3B is a front view showing in partially cross-section the opening/closing of a valve of the light source unit in the same installation posture.

When the projection display device 11 is installed in a first installation posture rendering the position of the projection lens 11a as shown in FIG. 3A, the branch switching valve 10 provided in the air duct 9 is rotated under its own weight, so that the air duct 9 is blocked in a direction toward the air blowing port 6b as shown in FIG. 3B. Accordingly, air supplied by the fan is sent through the air duct 9 only in a direction toward the air blowing port 6a.

Figure 3C:
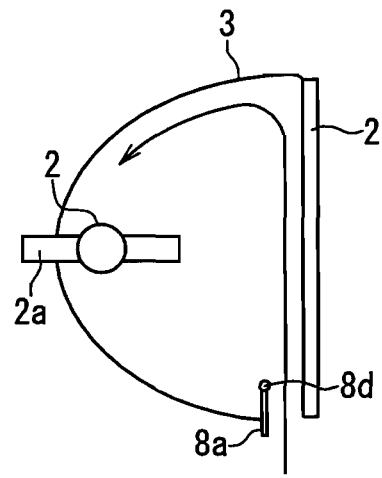
FIG. 3C is a side cross-sectional view showing a flow of cooling air in a lamp in the same installation posture.

As shown in FIG. 3C, the air control baffle 8a, which is attached to the air blowing port 6a and is rotatable around the rotation axis 8d, is rotated under its own weight to hang in a vertically downward direction. Accordingly, air that has passed through the air duct 9 flows into the concave mirror 3 and is guided in a vertically upward direction along the glass part 4.

Thereafter, air that has impinged on an inner top of the concave mirror 3 flows toward the top of the light source lamp 2 along the shape of the concave mirror 3 to cool the light source lamp 2, followed by being exhausted through the exhaust port 7.

Figure 4A:
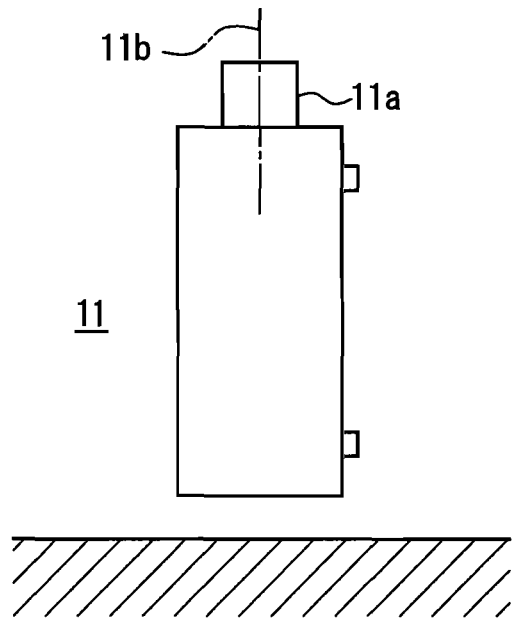
FIG. 4A is a side view showing a second installation posture of the projection display device according to Embodiment 1 of the present invention.
Figure 4B:
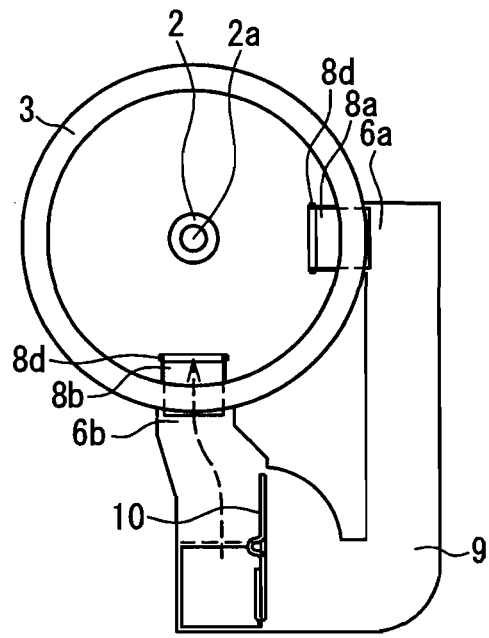
FIG. 4B is a front view showing in partially cross-section the opening/closing of the valve of the light source unit in the same installation posture.

When the projection display device 11 is installed in a second installation posture rendering the position of the projection lens 11a as shown in FIG. 4A, the branch switching valve 10 provided in the air duct 9 is rotated under its own weight, so that the air duct 9 is blocked in a direction toward the air blowing port 6a as shown in FIG. 4B. Accordingly, air supplied by the fan is sent through the air duct 9 only in a direction toward the air blowing port 6b.

Figure 4C:
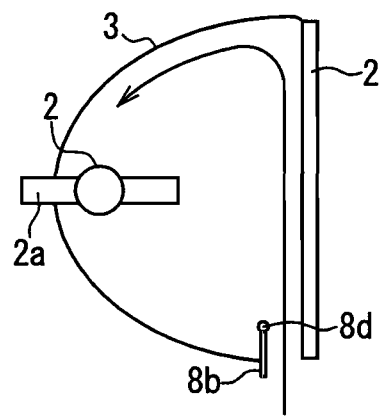
FIG. 4C is a side cross-sectional view showing a flow of cooling air in the lamp in the same installation posture.

As shown in FIG. 4C, the air control baffle 8b, which is attached to the air blowing port 6b and is rotatable around the rotation axis 8d, is rotated under its own weight to hang in a vertically downward direction. Accordingly, air that has passed through the air duct 9 flows into the concave mirror 3 and is guided in a vertically upward direction along the glass part 4.

Thereafter, air that has impinged on an inner top of the concave mirror 3 flows toward the top of the light source lamp 2 along the shape of the concave mirror 3 to cool the light source lamp 2, followed by being exhausted through the exhaust port 7.

Figure 5A:
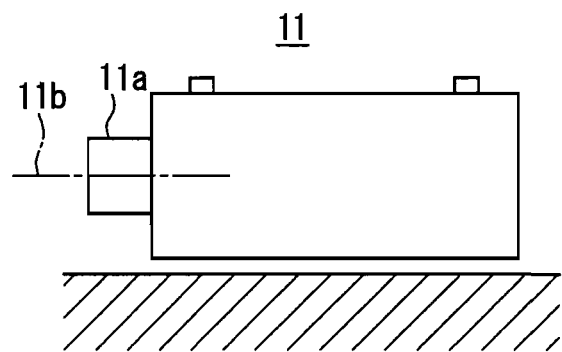
FIG. 5A is a side view showing a third installation posture of the projection display device according to Embodiment 1 of the present invention.
Figure 5B:
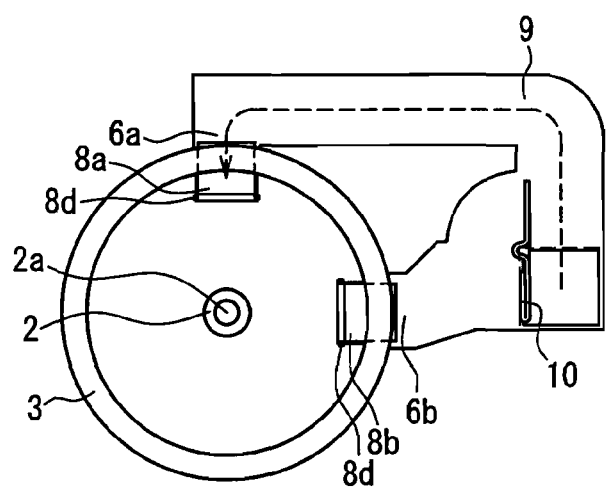
FIG. 5B is a front view showing in partially cross-section the opening/closing of the valve of the light source unit in the same installation posture.

When the projection display device 11 is installed in a third installation posture rendering the position of the projection lens 11a as shown in FIG. 5A, the branch switching valve 10 provided in the air duct 9 is rotated under its own weight, so that the air duct 9 is blocked in a direction toward the air blowing port 6b as shown in FIG. 5B. Accordingly, air supplied by the fan is sent only in a direction toward the air blowing port 6a.

Figure 5C:
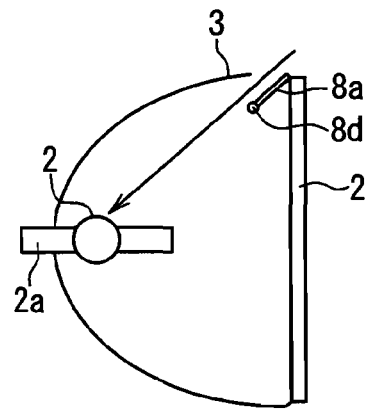
FIG. 5C is a side cross-sectional view showing a flow of cooling air in the lamp in the same installation posture.

As shown in FIG. 5C, the air control baffle 8a, which is attached to the air blowing port 6a and is rotatable around the rotation axis 8d, is rotated under its own weight. However, as shown in FIG. 5C, since the rotation axis 8d is located below the weight portion 8c, the air control baffle 8a is inclined. Accordingly, air that has passed through the air duct 9 flows into the concave mirror 3 in an oblique direction, and is blown toward the top of the light source lamp 2 to cool the light source lamp 2, followed by being exhausted through the exhaust port 7.

Figure 6A:
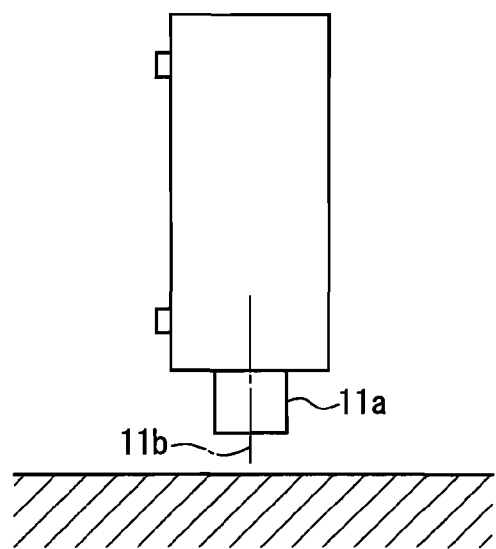
FIG. 6A is a side view showing a fourth installation posture of the projection display device according to Embodiment 1 of the present invention.
Figure 6B:
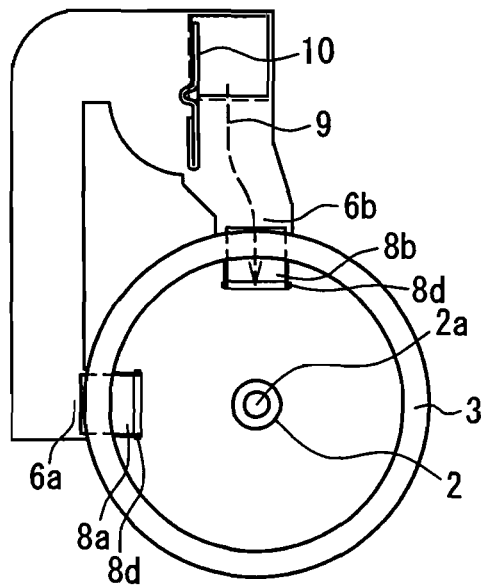
FIG. 6B is a front view showing in partially cross-section the opening/closing of the valve of the light source unit in the same installation posture.

When the projection display device 11 is installed in a fourth installation posture rendering the position of the projection lens 11a as shown in FIG. 6A, the branch switching valve 10 provided in the air duct 9 is rotated under its own weight, so that the air duct 9 is blocked in a direction toward the air blowing port 6a as shown in FIG. 6B. Accordingly, air supplied by the fan is sent through the air duct 9 only in a direction toward the air blowing port 6b.

Figure 6C:
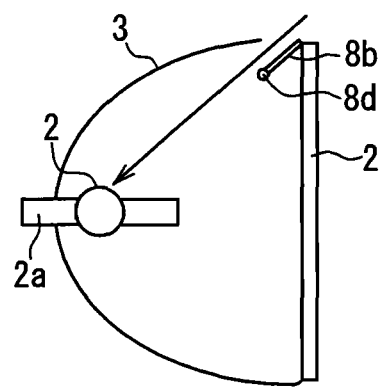
FIG. 6C is a side cross-sectional view showing a flow of cooling air in the lamp in the same installation posture.

As shown in FIG. 6C, the air control baffle 8b, which is attached to the air blowing port 6b and is rotatable around the rotation axis 8d, is rotated under its own weight. However, as shown in FIG. 6C, since the rotation axis 8d is located below the weight portion 8c, the air control baffle 8b is inclined. Accordingly, air that has passed through the air duct 9 flows into the concave mirror 3 in an oblique direction, and is blown toward the top of the light source lamp 2 to cool the light source lamp 2, followed by being exhausted through the exhaust port 7.

As described above, the branch switching valve 10 and the air control baffles 8a and 8b turn in different directions depending on the installation posture of the projection display device 11, so that cooling air always is allowed to flow to cool the top of the light source lamp 2.

The branch switching valve 10 is not limited to be rotated under its own weight, but it is also possible to control the operation of the branch switching valve by detecting the installation posture with an angle sensor provided in the projection display device.

Embodiment 2

Figure 7:
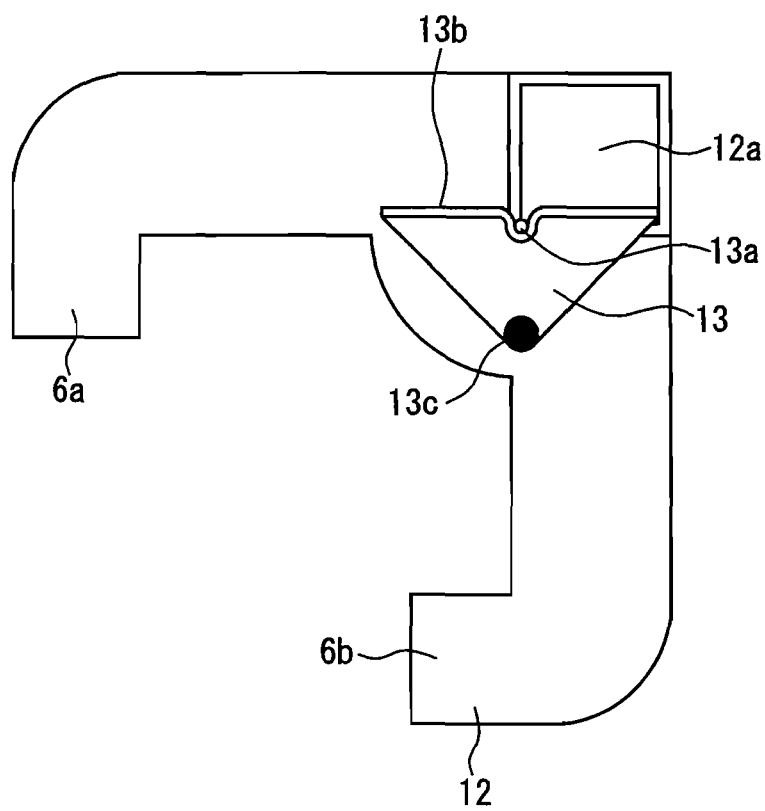
FIG. 7 is a view showing a configuration of a rotary valve portion included in a projection display device according to Embodiment 2 of the present invention.

FIG. 7 is a view showing a configuration of a rotary valve portion included in a projection display device according to Embodiment 2 of the present invention. A configuration and an operation for cooling a light source lamp are the same as those in Embodiment 1, and thus descriptions thereof will not be repeated.

In the figure, a branch switching valve 13 provided in an air duct 12 includes an axis 13a vertical to the air duct 12 and the direction of gravity, a wall plate 13b functioning to switch a flow rate, and a barycenter 13c located at a position away from the axis 13a, and is rotated around the axis 13a under its own weight.

With this configuration, the problem involved in Embodiment 1 can be solved. That is, in Embodiment 1, since the air blowing ports 6a and 6b are provided at different distances from the entrance 9a of the air duct 9, the fan has a different air flow resistance, resulting in a different cooling capability. On the other hand, the branch switching valve 13 with the above-described configuration allows the air blowing ports 6a and 6b to be provided at equal distances from an entrance 12a of the air duct 12, resulting in the same cooling capability. Consequently, it becomes possible to cool the light source lamp optimally without changing a voltage of the fan depending on a posture of the projection display device.

As described above, since the barycenter is located at the position away from the axis 13a, the branch switching valve 13 can be rotated stably.

The branch switching valve 13 is not limited to be rotated under its own weight, but it is also possible to control the operation of the branch switching valve by detecting an installation posture with an angle sensor provided in the projection display device.

Embodiment 3

Figure 8A:
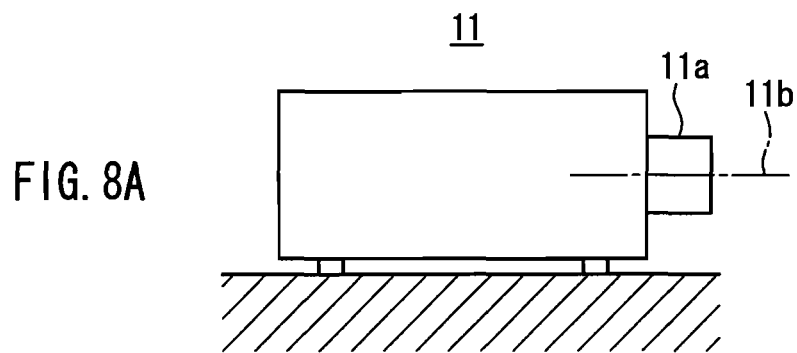
FIG. 8A is a side view showing an installation posture of a projection display device according to Embodiment 3 of the present invention.
Figure 8B:
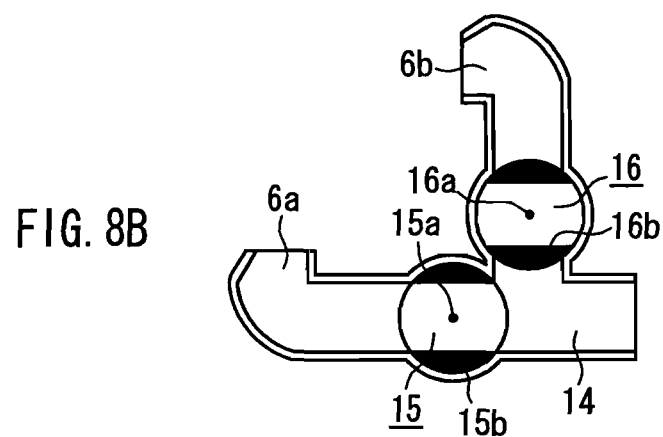
FIG. 8B is a view showing a state of a built-in rotary valve portion in the same installation posture.

FIGS. 8A to 8D are views showing installation postures of a projection display device and configurations of a rotary valve portion included therein according to Embodiment 3 of the present invention. FIGS. 8A and 8B correspond to each other, and FIGS. 8C and 8D correspond to each other. A configuration and an operation for cooling a light source lamp are the same as those in Embodiment 1, and thus descriptions thereof will not be repeated.

In the figures, two branch switching valves 15 and 16 respectively having axes 15a and 16a vertical to an air duct 14 and the direction of gravity are provided in the air duct 14. The valves have weight portions 15b and 16b, respectively.

When the projection display device 11 is installed in a posture rendering the position of the projection lens 11a as shown in FIG. 8A, the branch switching valves 15 and 16 respectively are rotated around the axes 15a and 16a so that the weight portions 15b and 16b are oriented downward as shown in FIG. 8B. In this state, the branch switching valve 15 does not block the air duct 14, while the branch switching valve 16 blocks the air duct 14, whereby air supplied by the fan is sent only in a direction toward the air blowing port 6a.

Figure 8C:
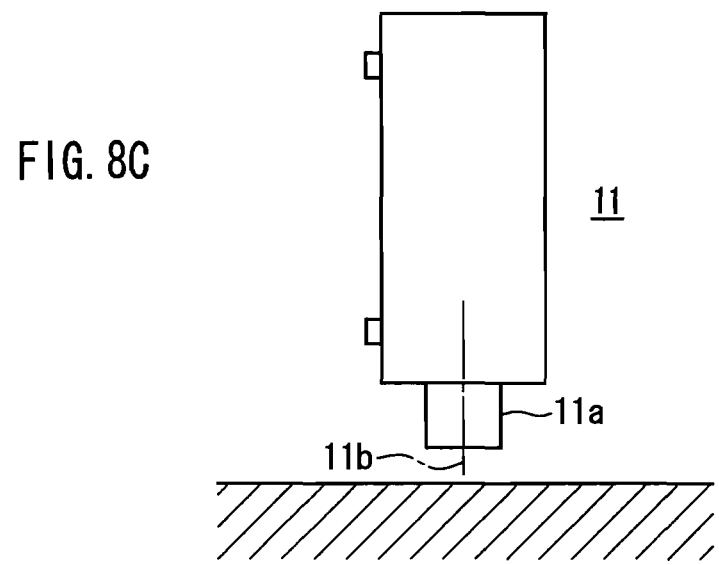
FIG. 8C is a side view showing another installation posture of the projection display device according to Embodiment 3 of the present invention.
Figure 8D:
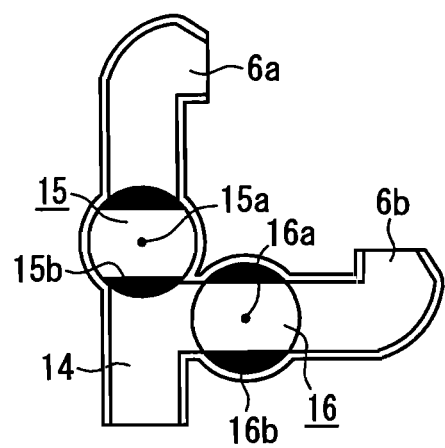
FIG. 8D is a view showing a state of the built-in rotary valve portion in the same installation posture.

When the projection display device 11 is installed in a posture rendering the position of the projection lens 11a as shown in FIG. 8C, the branch switching valves 15 and 16 respectively are rotated around the axes 15a and 16a so that the weight portions 15b and 16b are oriented downward as shown in FIG. 8D. In this state, the branch switching valve 15 blocks the air duct 14, while the branch switching valve 16 does not block the air duct 14, whereby air supplied by the fan is sent only in a direction toward the air blowing port 6b.

In the present embodiment, air is sent to only one of the air blowing ports depending on the installation posture. However, it is also possible to send air to both the air blowing ports at a necessary rate by, for example, changing the shapes of the two valves.

As described above, with the valves provided at the respective air blowing ports, it is possible to adjust the rate of air volume to be sent to the respective air blowing ports easily, thereby cooling the light source lamp optimally.

The branch switching valves 15 and 16 are not limited to be rotated under the weight portions 15b and 16b, but it is also possible to control the operations of the branch switching valves by detecting the installation posture with an angle sensor provided in the projection display device.

The projection display device according to each of the above-described embodiments allows the top of the light source lamp to be cooled efficiently, prevents the bottom of the light source lamp from being overcooled, and allows both lateral sides of the light source lamp to be cooled at an optimum temperature, even in any installation posture. Therefore, it is possible to prevent whitening, a shortened life, and a rupture as well as blacking and lower brightness of the light source, which greatly serves to increase the reliability of the projection display device. Further, since only one fan is required to provide cooling regardless of installation posture, it is possible to reduce the size and cost of the projection display device, and further to reduce noise of the projection display device due to efficient cooling.

Embodiment 4

FIGS. 9A to 9D show a configuration and an operation of a light source cooling unit of a projection image display device according to Embodiment 4. These figures are cross-sectional views of an air duct 20 in a circumferential direction seen from a light-emitting direction. The air duct 20 corresponds to the air duct 123 through which cooling air supplied by the light source fan 124 is guided toward the air blowing ports 125 in FIG. 1 showing an entire configuration of the projection image display device.

FIGS. 9A to 9D show respective states when the projection image display device is installed in a floor-standing posture, an upward posture, a downward posture, and a ceiling-hung posture. FIG. 10 is a perspective view of this configuration seen from an opening side of the concave mirror 3. Since these figures are intended to explain a flow of air, components other than the air duct 20 and the discharge lamp 2 of the light source unit 1 are not shown.

In the present embodiment, air blowing ports 26, 27, 28, and 29 corresponding to the air blowing ports 125 in FIG. 1 are disposed in a circumferential portion of the air duct 20 at positions corresponding to four directions in which they are orthogonal to one another with a lamp axis of the discharge lamp 2 as a center. Each of the air blowing ports 26, 27, 28, and 29 has an air guide plate (different from a control valve; not shown) that guides air toward the discharge lamp 2. The air duct 20 is divided into two branch flow paths at a base connected to the light source fan 124. The adjacent air blowing ports 26 and 27 are disposed at a first flow path 24 as one of the branch flow paths, and the adjacent air blowing ports 28 and 29 are disposed at a second flow path 25 as the other branch flow path.

The air duct 20 is provided with a columnar branch switching valve 21 that is movable in the air duct 20 by the action of gravity so as to switch between the two flow paths to allow air supplied by the light source fan 124 to flow therethrough. The flow paths switched therebetween have a first control valve 22 and a second control valve 23, respectively.

The first and second control valves 22 and 23 have shield plates on both sides of supporting axes 22a and 23a, respectively. In the present embodiment, the centers of gravity of the shield plates are located to the air blowing ports 26 and 28 sides relative to the supporting axes 22a and 23a.

Accordingly, the first and second control valves 22 and 23 are rotated around the supporting axes 22a and 23a by the action of gravity, so that air is blown out automatically through one of the air blowing ports 26, 27, 28, and 29 of the air duct 20 that is located above the discharge lamp 2.

The following is a detailed description of how air is guided in the respective states. An arrow in the figures indicates a flow of air.

Figure 9A:
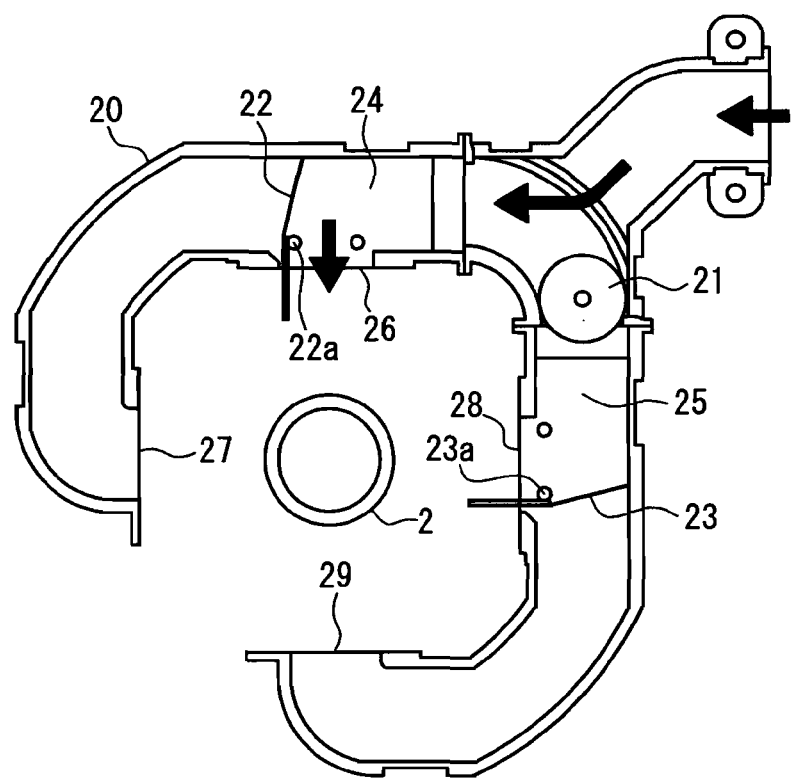
FIG. 9A is a cross-sectional view of an air duct in a circumferential direction when a projection image display device according to Embodiment 4 of the present invention is installed in a floor-standing posture.
Figure 10:
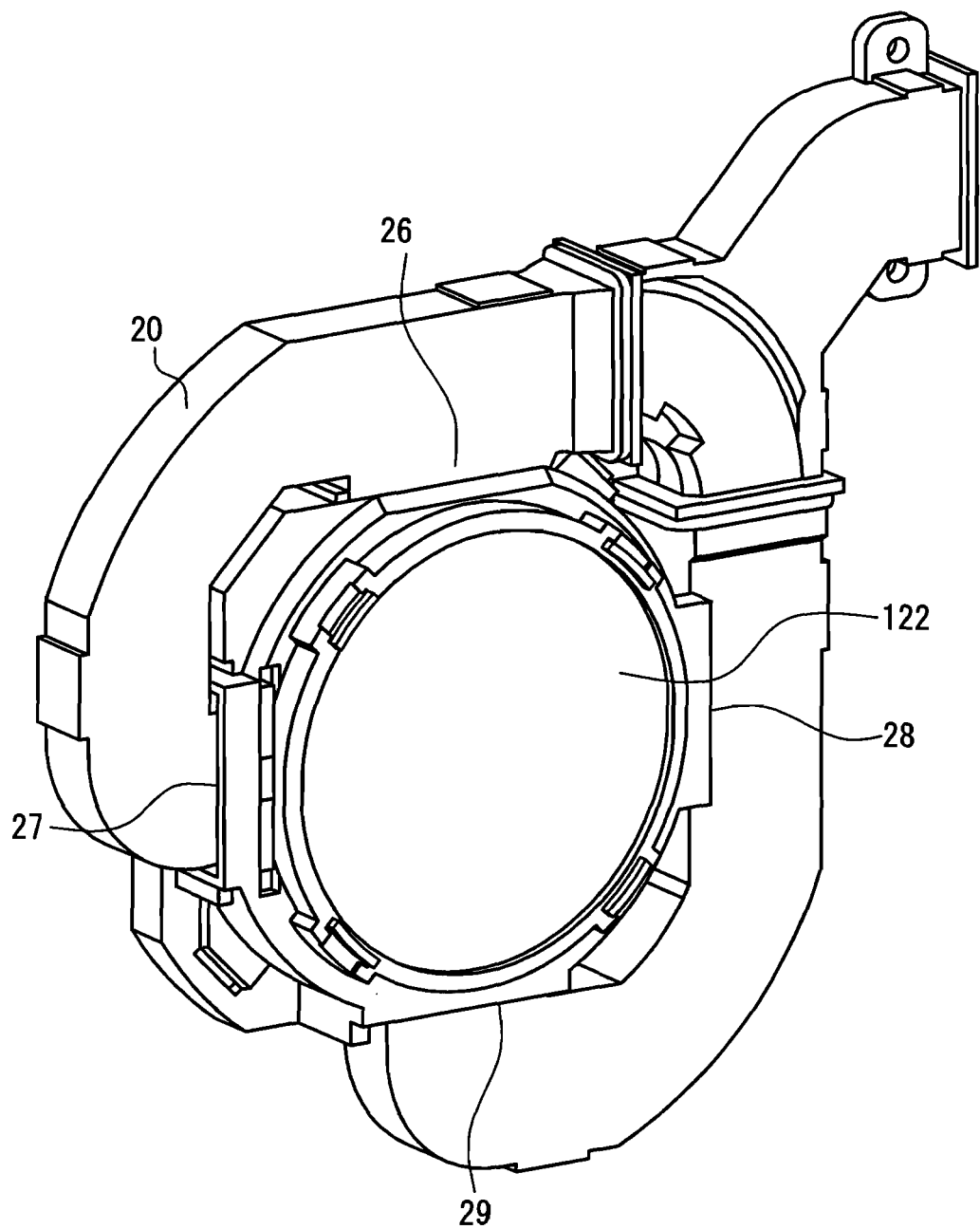
FIG. 10 is a perspective view of the air duct of the same projection image display device.

FIG. 9A is a view when the entire device is in a floor-standing state (inclination angle: 0 degree). At this time, the branch switching valve 21 moves to a position shown in the figure by the action of gravity. Accordingly, the first flow path 24 is opened, allowing air supplied by the light source fan 124 to flow therethrough, while the second flow path 25 is blocked by the branch switching valve 21, allowing no air to flow therethrough.

Meanwhile, the first control valve 22 is rotated around the supporting axis 22a by the action of gravity to block the first flow path 24. Accordingly, air guided into the first flow path 24 flows in through the opened air blowing port 26 and is guided by the air guide plate not shown to cool the top of the discharge lamp 2.

Figure 9B:
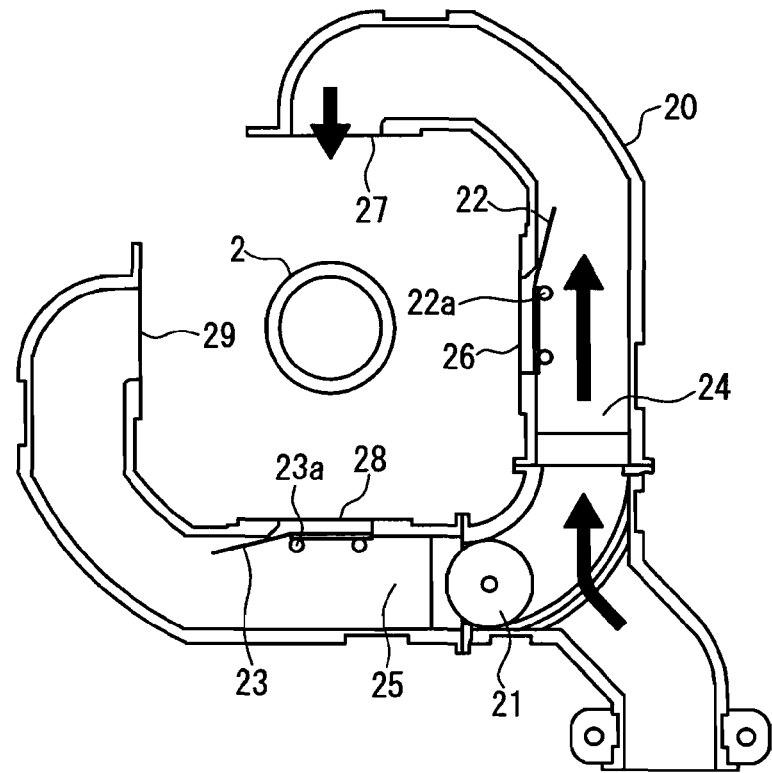
FIG. 9B is a cross-sectional view of the air duct in the circumferential direction when the same projection image display device is installed in an upward posture.

FIG. 9B is a view when the entire device is in an upward state (inclination angle: 90 degrees). The branch switching valve 21 moves to the same position as in FIG. 9A by the action of gravity. Accordingly, the first flow path 24 is opened, allowing air supplied by the light source fan 124 to flow therethrough, while the second flow path 25 is blocked by the branch switching valve 21, allowing no air to flow therethrough.

Meanwhile, the first control valve 22 is rotated around the supporting axis 22*a* by the action of gravity to block the air blowing port 26 as shown in the figure. Accordingly, air guided into the first flow path 24 flows therethrough without flowing in through the air blowing port 26, flows in through the air blowing port 27 provided at the end of the first flow path 24, and is guided by the air guide plate not shown to cool the top of the discharge lamp 2.

Figure 9C:
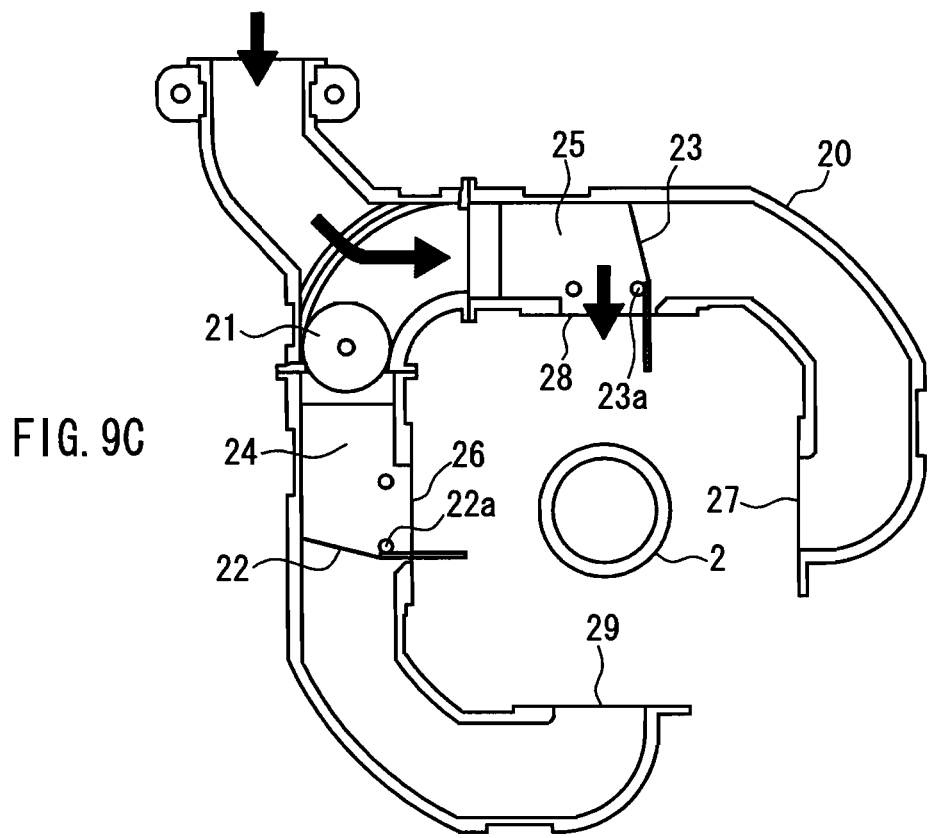
FIG. 9C is a cross-sectional view of the air duct in the circumferential direction when the same projection image display device is installed in a downward posture.

FIG. 9C is a view when the entire device is in a downward state (inclination angle: −90 degrees). At this time, the branch switching valve 21 moves to a position different from that in FIGS. 9A and 9B by the action of gravity. Accordingly, the first flow path 24 is blocked, while the second flow path 25 is opened, thereby allowing air supplied by the light source fan 124 to be guided into the second flow path 25.

Meanwhile, similarly to the first control valve 22, the second control valve 23 is rotated around the supporting axis 23*a* by the action of gravity to block the second flow path 25. Accordingly, air guided into the second flow path 25 flows in through the opened air blowing port 28 and is guided by the air guide plate not shown to cool the top of the discharge lamp 2.

Figure 9D:
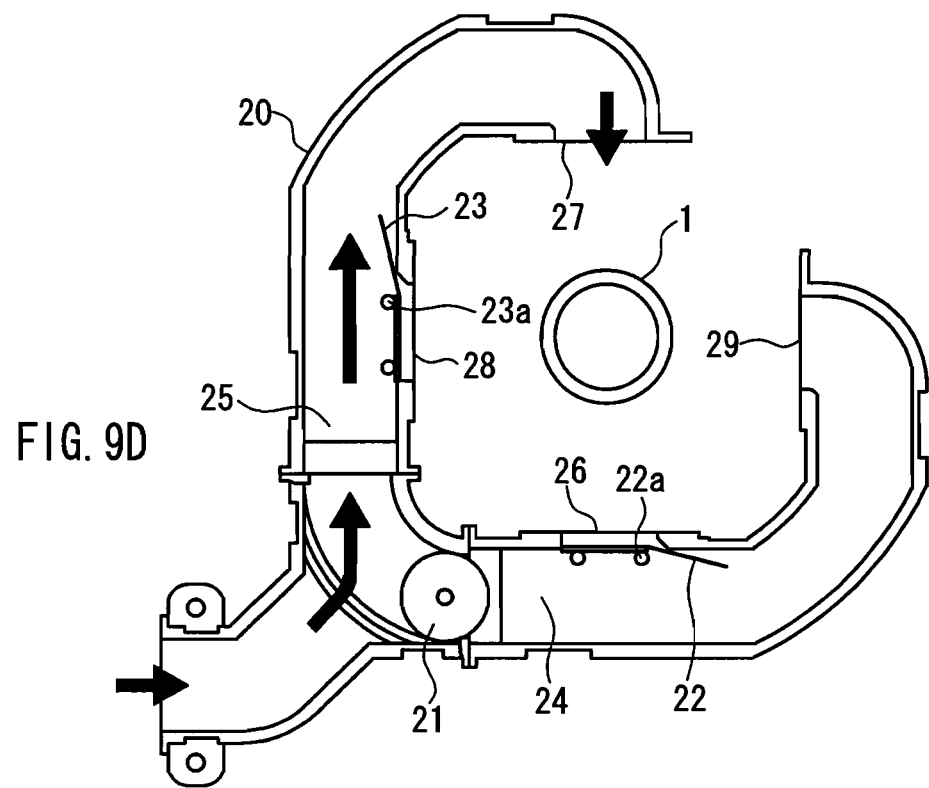
FIG. 9D is a cross-sectional view of the air duct in the circumferential direction when the same projection image display device is installed in a ceiling-hung posture.

FIG. 9D is a view when the entire device is in a ceiling-hung state (inclination angle: 180 degrees). The branch switching valve 21 moves to the same position as in FIG. 9C by the action of gravity. Accordingly, the second flow path 25 is opened, allowing air supplied by the light source fan 124 to flow therethrough, while the first flow path 24 is blocked by the branch switching valve 21, allowing no air to flow therethrough.

Meanwhile, the second control valve 23 is rotated around the supporting axis 23*a* by the action of gravity to block the air blowing port 28 as shown in the figure. Accordingly, air guided into the second flow path 25 flows therethrough without flowing in through the air blowing port 28, flows in through the air blowing port 27 provided at the end of the second flow path 25, and is guided by the air guide plate not shown to cool the top of the discharge lamp 2

As described above, it is possible to always cool intensively the opposite side to gravity, i.e., the top surface of the discharge lamp 2 that reaches a high temperature, depending on the posture of the device. Thus, it becomes possible to maintain the performance of the light source in any posture.

In the above description, the states in FIGS. 9A, 9B, 9C, and 9D are regarded as a floor-standing state, an upward state, a downward state, and an inverted ceiling-hung state, respectively. However, it should be understood that these states can be regarded differently depending on where air supplied by the fan flows in, or the like. For example, the state in FIG. 9B may be regarded as a floor-standing state, and the state in FIG. 9C may be regarded as an upward state.

Further, the first control valve 22 and the second control valve 23 have shield plates on both sides of the supporting axes 22*a* and 23*a*, respectively, such that the centers of gravity of the shield plates are located to the one sides. However, the shape of the first control valve 22 and the second control valve 23 is not limited thereto. It is apparent that another shape is available as long as the requirements for size, the locations of the centers of gravity, and the like are met.

Further, although the branch switching valve 21 has a columnar shape, a spherical shape or the like may be applied depending on a cross-sectional shape of the flow path.

Embodiment 5

FIGS. 11A to 11D show a configuration and an operation of a light source cooling unit of a projection image display device according to Embodiment 5. These figures are cross-sectional views of the air duct 20 in a circumferential direction seen from a light-emitting direction. The air duct 20 corresponds to the air duct 123 through which air supplied by the light source fan 124 is guided toward the air blowing ports 125 in FIG. 1 showing an entire configuration of the projection image display device.

FIGS. 11A to 11D show respective states when the projection image display device is installed in a floor-standing posture, an upward posture, a downward posture, and a ceiling-hung posture. Since these figures are intended to explain a flow of air, components other than the air duct 20 and the discharge lamp 2 of the light source unit 1 are not shown.

In the present embodiment, air blowing ports 34, 35, 37, and 38 corresponding to the air blowing ports 125 in FIG. 1 are disposed in a circumferential direction of the air duct 20 in four directions in which they are orthogonal to one another. Each of the air blowing ports 34, 35, 37, and 38 has an air guide plate (not shown) that guides air toward the discharge lamp 2.

In the figures, the air duct 20 is provided with a branch switching valve 30 that is rotatable around a supporting axis 30*a* in the air duct 20 by the action of gravity so as to switch between two flow paths to allow air supplied by the light source fan 124 to flow therethrough, and a first control valve 31 and a second control valve 32 that are disposed in the respective flow paths switched therebetween.

The branch switching valve 30 has a cantilever shape with a shield plate provided on one side of the supporting axis 30*a*.

As in Embodiment 4, the first and second control valves 31 and 32 have shield plates on both sides of supporting axes 31*a* and 32*a*, respectively, such that the centers of gravity of the shield plates are located to the air blowing ports 34 and 37 sides relative to the supporting axes 31*a* and 32*a*.

Accordingly, the first and second control valves 31 and 32 are rotated around the supporting axes 31*a* and 32*a* by the action of gravity, so that air is blown out automatically through one of the air blowing ports 34, 35, 37, and 38 of the air duct 20 that is located above the discharge lamp 2 of the light source unit 1.

The following is a detailed description of how air is guided in the respective states. An arrow in the figures indicates a flow of air.

Figure 11A:
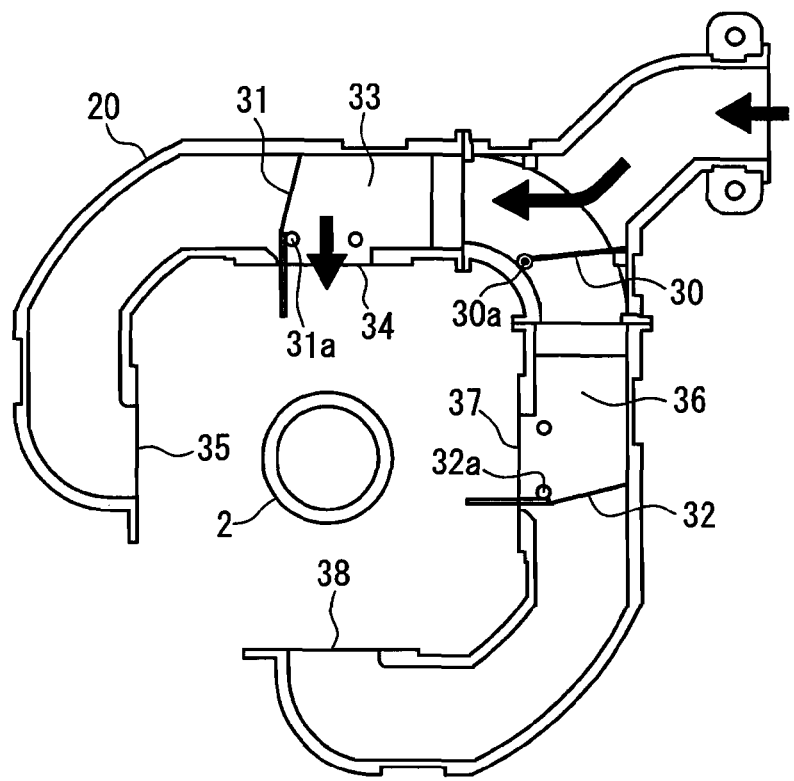
FIG. 11A is a cross-sectional view of an air duct in a circumferential direction when a projection image display device according to Embodiment 5 of the present invention is installed in a floor-standing posture.

FIG. 11A is a view when the entire device is in a floor-standing state (inclination angle: 0 degree). At this time, the branch switching valve 30 is rotated around the supporting axis 30*a* by the action of gravity. Accordingly, as shown in the figure, a first flow path 33 is opened, allowing air supplied by the light source fan 124 to flow therethrough, while a second flow path 36 is blocked by the branch switching valve 30, allowing no air to flow therethrough.

Meanwhile, the first control valve 31 is rotated around the supporting axis 31*a* by the action of gravity to block the first flow path 33. Accordingly, air guided into the first flow path 33 flows in through the opened air blowing port 34 and is guided by the air guide plate not shown to cool the top of the discharge lamp 2

Figure 11B:
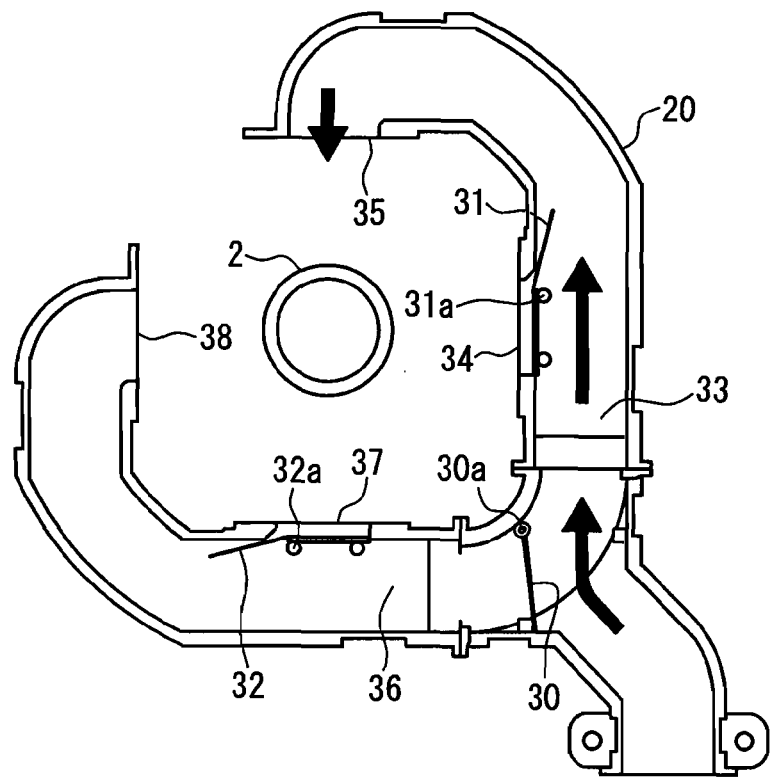
FIG. 11B is a cross-sectional view of the air duct in the circumferential direction when the same projection image display device is installed in an upward posture.

FIG. 11B is a view when the entire device is in an upward state (inclination angle: 90 degrees). The branch switching valve 30 moves to the same position as in FIG. 11A by the action of gravity. Accordingly, the first flow path 33 is opened, allowing air supplied by the light source fan 124 to flow therethrough, while the second flow path 36 is blocked by the branch switching valve 30, allowing no air to flow therethrough.

Meanwhile, the first control valve 31 is rotated around the supporting axis 31*a* by the action of gravity to block the air blowing port 34 as shown in the figure. Accordingly, air guided into the first flow path 33 flows therethrough without flowing in through the air blowing port 34, flows in through the air blowing port 35 provided at the end of the first flow path 33, and is guided by the air guide plate not shown to cool the top of the discharge lamp 2.

Figure 11C:
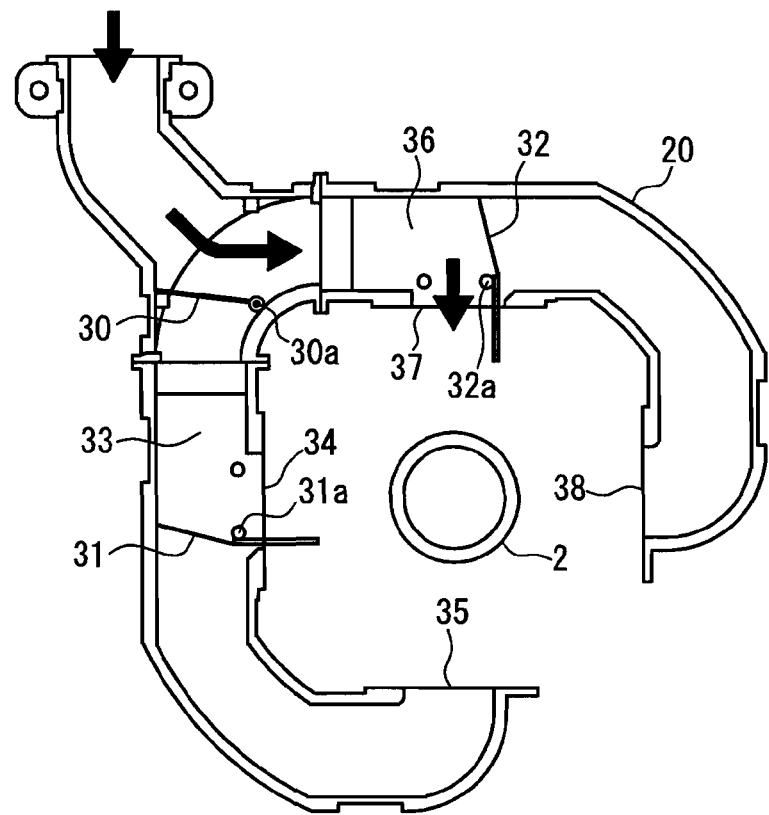
FIG. 11C is a cross-sectional view of the air duct in the circumferential direction when the same projection image display device is installed in a downward posture.

FIG. 11C is a view when the entire device is in a downward state (inclination angle: −90 degrees). At this time, the branch switching valve 30 is rotated to a position different from that in FIGS. 11A and 11B by the action of gravity. Accordingly, the first flow path 33 is blocked, while the second flow path 36 is opened, thereby allowing air supplied by the light source fan 124 to be guided into the second flow path 36.

Meanwhile, similarly to the first control valve 31, the second control valve 32 is rotated around the supporting axis 32a by the action of gravity to block the second flow path 36. Accordingly, air guided into the second flow path 36 flows in through the opened air blowing port 37 and is guided by the air guide plate not shown to cool the top of the discharge lamp 2.

Figure 11D:
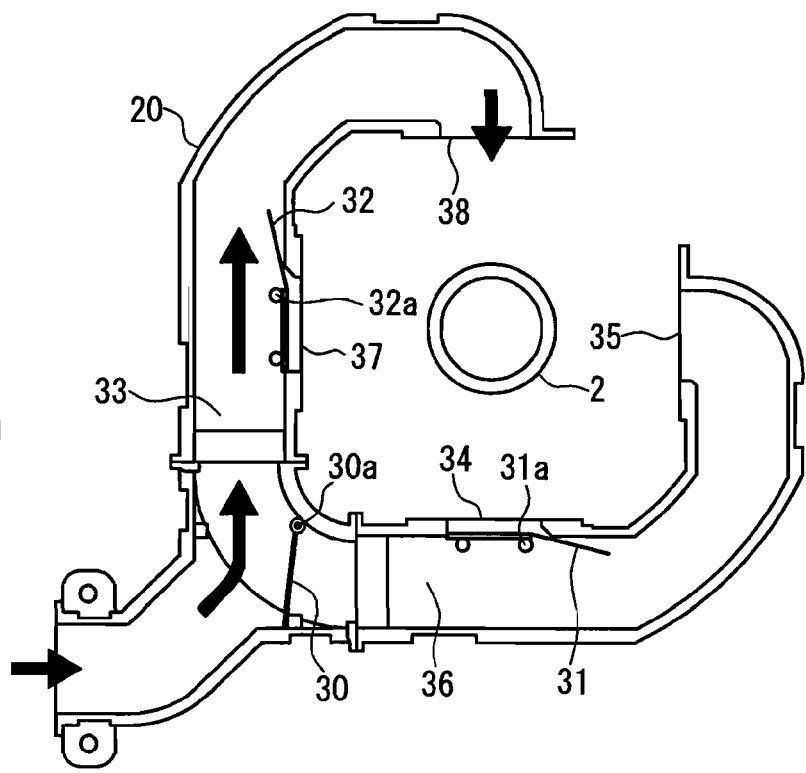
FIG. 11D is a cross-sectional view of the air duct in the circumferential direction when the same projection image display device is installed in a ceiling-hung posture.

FIG. 11D is a view when the entire device is in a ceiling-hung state (inclination angle: 180 degrees). The branch switching valve 30 is rotated to the same position as in FIG. 11C by the action of gravity. Accordingly, the second flow path 36 is opened, allowing air supplied by the light source fan 124 to flow therethrough, while the first flow path 33 is blocked by the branch switching valve 30, allowing no air to flow therethrough.

Meanwhile, the second control valve 32 is rotated around the supporting axis 32a by the action of gravity to block the air blowing port 37 as shown in the figure. Accordingly, air guided into the second flow path 36 flows therethrough without flowing in through the air blowing port 37, flows in through the air blowing port 38 provided at the end of the second flow path 36, and is guided by the air guide plate not shown to cool the top of the discharge lamp 2

As described above, it is possible to always cool intensively the opposite side to gravity, i.e., the top surface of the discharge lamp 2 that reaches a high temperature, depending on the posture of the device. Thus, it becomes possible to maintain the performance of the light source in any posture.

Also in the present embodiment, as in Embodiment 4, the states in FIGS. 11A, 11B, 11C, and 11D are regarded as a floor-standing state, an upward state, a downward state, and an inverted ceiling-hung state, respectively. However, it should be understood that these states can be regarded differently depending on where air supplied by the fan flows in, or the like. For example, the state in FIG. 11B may be regarded as a floor-standing state, and the state in FIG. 11C may be regarded as an upward state.

Further, the first control valve 31 and the second control valve 32 have shield plates on both sides of the supporting axes 31a and 32a, respectively, such that the centers of gravity of the shield plates are located to the one sides. However, the shape of the first and second control valves 31 and 32 is not limited thereto, and another shape is available as long as the requirements for size, the locations of the centers of gravity, and the like are met.

Further, although the branch switching valve 30 has a cantilever shape with a shield plate provided on one side of the supporting axis 30a, another shape (such as a balancing-toy type) may be applied.

Embodiment 6

FIGS. 12A to 12D show a configuration and an operation of a light source cooling unit of a projection image display device according to Embodiment 6. These figures are cross-sectional views of an air duct 39 in a circumferential direction seen from a light-emitting direction. The air duct 39 corresponds to the air duct 123 through which air supplied by the light source fan 124 is guided toward the air blowing ports 125 in FIG. 1 showing an entire configuration of the projection image display device.

FIGS. 12A to 12D show respective states when the projection image display device is installed in a floor-standing posture, an upward posture, a downward posture, and a ceiling-hung posture. Since these figures are intended to explain a flow of air, components other than the air duct 39 and the discharge lamp 2 of the light source unit 1 are not shown.

In the present embodiment, air blowing ports 45, 47, 48, and 49 corresponding to the air blowing ports 125 in FIG. 1 are disposed in a circumferential direction of the air duct 39 in four directions in which they are orthogonal to one another. Each of the air blowing ports 45, 47, 48, and 49 has an air guide plate (not shown) that guides air toward the discharge lamp 2.

In the present embodiment, unlike Embodiments 4 and 5, one of the air blowing ports through which cooling air is sent is located below the discharge lamp 2.

Air blown out through the air blowing port located below the discharge lamp 2 is allowed to flow up along the front glass 122 by the air guide plate to impinge on an inner surface of the concave mirror 3, and then is guided along the inner surface of the concave mirror 3 toward the discharge lamp 2 that reaches the highest temperature, thereby cooling the top of a light bulb of the discharge lamp 2.

In the figures, the air duct 39 is provided with a first branch switching valve 40 and a second branch switching valve 41 that are rotatable around supporting axes 40a and 41a, respectively, in the air duct 39 by the action of gravity so as to switch between two flow paths to allow air supplied by the light source fan 124 to flow therethrough, and a first control valve 42 and a second control valve 43 that are disposed in the respective flow paths switched therebetween.

The first branch switching valve 40 and the second branch switching valve 41 are disposed on a first flow path 44 side and a second flow path 46 side, respectively, with a stopper 39a provided therebetween, and have a cantilever shape with shield plates provided on one sides of the supporting axes 40a and 41a, respectively.

Further, as in Embodiment 4, the first and second control valves 42 and 43 have shield plates on both sides of supporting axes 42a and 43a, respectively, such that the centers of gravity of the shield plates are located to one sides. The present embodiment is different from Embodiment 4 in that the centers of gravity are located to the first flow path 44 side and the second flow path 46 side, respectively, relative to the supporting axes 42a and 43a.

Accordingly, the first and second control valves 42 and 43 are rotated around the supporting axes 42a and 43a by the action of gravity, so that air is blown out automatically through one of the air blowing ports 45, 47, 48, and 49 of the air duct 39 that is located below the discharge lamp 2 of the light source unit 1.

The following is a detailed description of how air is guided in the respective states.

Figure 12A:
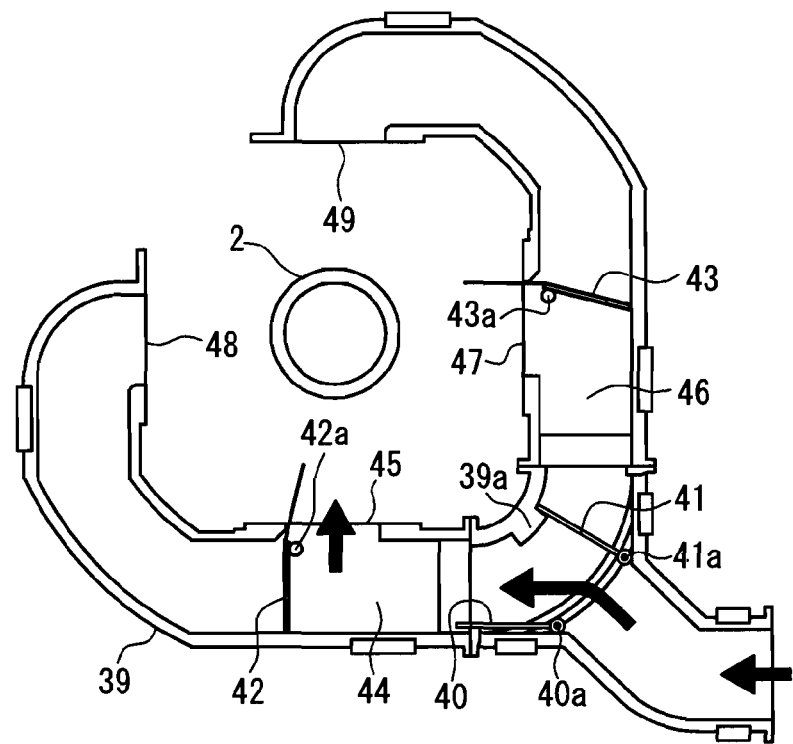
FIG. 12A is a cross-sectional view of an air duct in a circumferential direction when a projection image display device according to Embodiment 6 of the present invention is installed in a floor-standing posture.

FIG. 12A is a view when the entire device is in a floor-standing state (inclination angle: 0 degree). In this state, the second branch switching valve 41 is rotated around the supporting axis 41a by the action of gravity and stopped by the stopper 39a, so that the second flow path 46 is blocked, while the first branch switching valve 40 is rotated around the supporting axis 40a, so that the first flow path 44 is opened. Accordingly, air supplied by the light source fan 124 is guided into the first flow path 44.

Meanwhile, the first control valve 42 is rotated around the supporting axis 42a by the action of gravity to block the first flow path 44. Accordingly, air guided into the first flow path 44 flows in through the opened air blowing port 45 and is guided by the air guide plate not shown to flow up along the front glass 122. Then, the air impinges on the inner surface of the concave mirror 3, and then is guided along the inner surface of the concave mirror 3 toward the discharge lamp 2, thereby cooling the top of the discharge lamp 2.

Figure 12B:
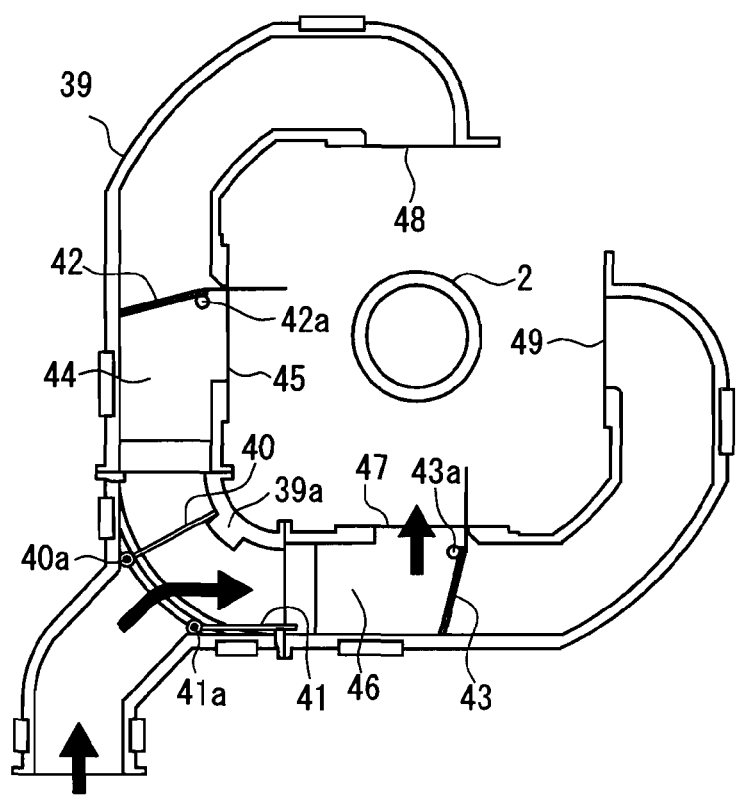
FIG. 12B is a cross-sectional view of the air duct in the circumferential direction when the same projection image display device is installed in an upward posture.

FIG. 12B is a view when the entire device is in an upward state (inclination angle: 90 degrees). At this time, the first branch switching valve 40 is rotated around the supporting axis 40a by the action of gravity in a direction different from that in FIG. 12A, and is stopped by the stopper 39a, so that the first flow path 44 is blocked, while the second branch switching valve 41 is rotated around the supporting axis 41a, so that the second flow path 46 is opened. Accordingly, air supplied by the light source fan 124 is guided into the second flow path 46.

Meanwhile, the second control valve 43 is rotated around the supporting axis 43a by the action of gravity to block the second flow path 46. Accordingly, air guided into the second flow path 46 flows in through the opened air blowing port 47 and is guided by the air guide plate not shown to flow up along the front glass 122. Then, the air impinges on the inner surface of the concave mirror 3, and then is guided along the inner surface of the concave mirror 3 toward the discharge lamp 2, thereby cooling the top of the discharge lamp 2.

Figure 12C:
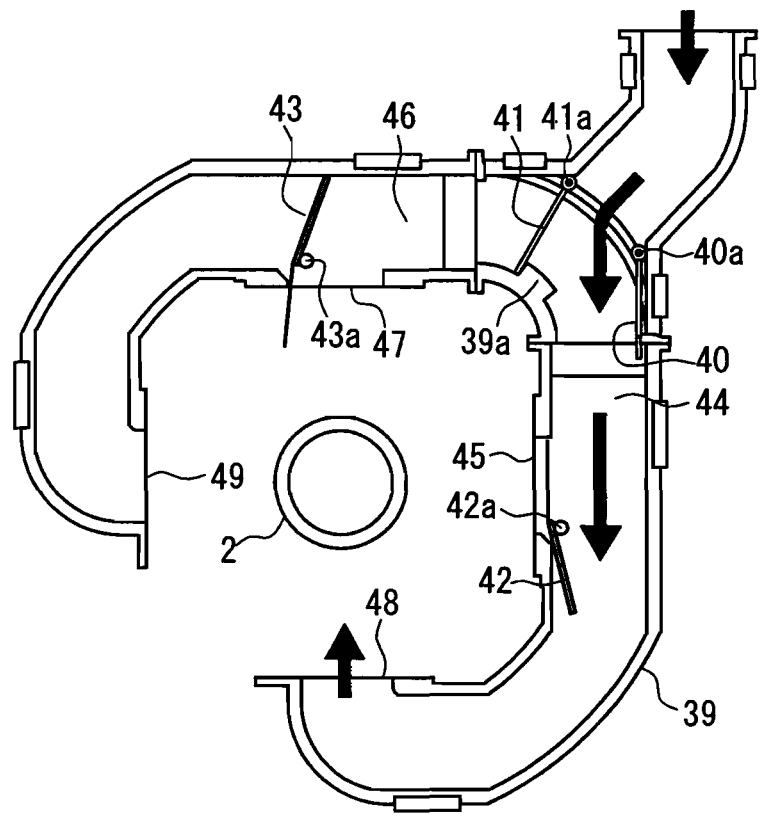
FIG. 12C is a cross-sectional view of the air duct in the circumferential direction when the same projection image display device is installed in a downward posture.

FIG. 12C is a view when the entire device is in a downward state (inclination angle: −90 degrees). The first branch switching valve 40 and the second branch switching valve 41 move to the same positions as in FIG. 12A by the action of gravity. Accordingly, the first flow path 44 is opened, allowing air supplied by the light source fan 124 to flow therethrough, while the second flow path 46 is blocked by the second branch switching valve 41, allowing no air to flow therethrough.

Meanwhile, the first control valve 42 is rotated around the supporting axis 42a by the action of gravity to block the air blowing port 45 as shown in the figure. Accordingly, air guided into the first flow path 44 flows therethrough without flowing in through the air blowing port 45, flows in through the air blowing port 48 provided at the end of the first flow path 44, and is guided by the air guide plate not shown to flow up along the front glass 122. Then, the air impinges on the inner surface of the concave mirror 3, and then is guided along the inner surface of the concave mirror 3 toward the discharge lamp 2, thereby cooling the top of the discharge lamp 2.

Figure 12D:
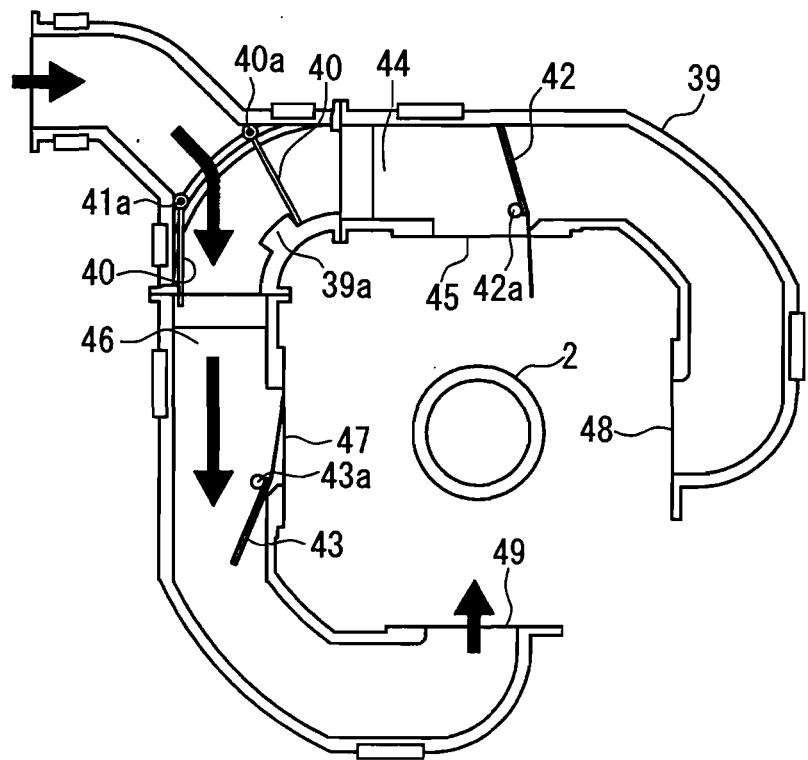
FIG. 12D is a cross-sectional view of the air duct in the circumferential direction when the same projection image display device is installed in a ceiling-hung posture.

FIG. 12D is a view when the entire device is in a ceiling-hung state (inclination angle: 180 degrees). The first branch switching valve 40 and the second branch switching valve 41 move to the same positions as in FIG. 12B by the action of gravity. Accordingly, the second flow path 46 is opened, allowing air supplied by the light source fan 124 to flow therethrough, while the first flow path 44 is blocked by the first branch switching valve 40, allowing no air to flow therethrough.

Meanwhile, the second control valve 43 is rotated around the supporting axis 43a by the action of gravity to block the air blowing port 47 as shown in the figure. Accordingly, air guided into the second flow path 46 flows therethrough without flowing in through the air blowing port 47, flows in through the air blowing port 49 provided at the end of the second flow path 46, and is guided by the air guide plate not shown to flow up along the front glass 122. Then, the air impinges on the inner surface of the concave mirror 3, and then is guided along the inner surface of the concave mirror 3 toward the discharge lamp 2, thereby cooling the top of the discharge lamp 2.

Also in the present embodiment, as in Embodiment 4, the states in FIGS. 12A, 12B, 12C, and 12D are regarded as a floor-standing state, an upward state, a downward state, and an inverted ceiling-hung state, respectively. However, it should be understood that these states can be regarded differently depending on where air supplied by the fan flows in, or the like. For example, the state in FIG. 12B may be regarded as a floor-standing state, and the state in FIG. 12C may be regarded as an upward state.

Further, the first control valve 42 and the second control valve 43 have shield plates on both sides of the supporting axes 42a and 43a, respectively, such that the centers of gravity of the shield plates are located to the one sides. However, the shape of the first control valve 42 and the second control valve 43 is not limited thereto. It is apparent that another shape is available as long as the requirements for size, the locations of the centers of gravity, and the like are met.

Further, although the first branch switching valve 40 and the second branch switching valve 41 have a cantilever shape with shield plates provided on one sides of the supporting axes 40a and 41a, respectively, another shape (such as a balancing-toy type) may be applied.

Further, in all the above-described embodiments, air flows in through one of the air blowing ports provided at the air duct connected to the concave mirror 3. However, the air blowing ports may be provided at the concave mirror 3.

Further, in all the above-described embodiments, it is desirable to provide an air blowing port at the base of the concave mirror 3 as an escape through which air sent to the discharge lamp 2 goes out. However, the present invention is not limited thereto, and it is possible, for example, to provide an additional escape hole in a place deviated from the path through which air that has flown in through the opening of the concave mirror 3 or the air duct is guided to the discharge lamp 2, according to need.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A projection display device comprising: a light source unit that includes a discharge lamp as a light source; an image formation unit; a projection optical system; and a light source cooling unit that cools the light source unit, thereby projecting an image displayed on the image formation unit by using light emitted from the light source unit, wherein the light source unit is disposed so that a lamp axis that connects two discharge electrodes of the discharge lamp is orthogonal to a projecting direction of the projection optical system, the light source unit comprises: a concave mirror whose central axis matches the lamp axis and that reflects the light emitted from the discharge lamp; and a transparent part that covers an opening of the concave mirror, and the light source cooling unit comprises:

a blowing fan that supplies cooling air;

a plurality of air blowing ports disposed in a circumferential portion of the concave mirror or a connecting part that connects the concave mirror and the transparent part, at positions corresponding to directions in which they are orthogonal to each other with the lamp axis as a center when viewed in the lamp axis direction;

an air duct that forms a plurality of branch flow paths connecting the air blowing ports and the blowing fan;

a branch switching valve that is disposed in the air duct and switches between the branch flow paths so as to allow the cooling air supplied by the blowing fan to flow therethrough; and a plurality of control valves, each of the air blowing ports being provided with one of the control valves, each of the control valves being rotated around a rotation axis that extends in a direction orthogonal or parallel to the lamp axis by the action of gravity depending on a posture of the light source cooling unit, thereby controlling a wind direction so that the cooling air is blown from above the discharge lamp, wherein each of the control valves is formed of an air control baffle that is rotatable around the rotation axis, the branch switching valve operates so as to send an airflow from an entrance of the air duct toward the air blowing port postured in a vertical direction among the air blowing ports disposed orthogonal to each other, while blocking an airflow toward the air blowing port postured in a horizontal direction, and each of the air control baffles is configured such that when the air blowing port postured in a vertical direction is positioned above the discharge lamp, the air control baffle is inclined, so that airflow through the air blowing port flows into the concave mirror in an oblique direction, thereby being blown toward the top of the light source lamp, and when the air blowing port postured in a vertical direction is positioned below the discharge lamp, the air control baffle hangs in a vertically downward direction, so that airflow through the air blowing port is guided in a vertically upward direction and then flows along the shape of the concave mirror, thereby being blown toward the top of the light source lamp.

2. The projection display device according to claim 1, wherein the air blowing ports are disposed at at least two positions.

3. The projection display device according to claim 2, wherein an exhaust port is provided at at least one position substantially opposed to the air blowing ports.

4. The projection display device according to claim 1 wherein the air control baffle has rotation stop positions in two directions depending on an installation posture of the projection display device.

5. The projection display device according to claim 4, wherein the rotation axis of each of the control valves extends in a direction orthogonal to the lamp axis in the vicinity of the opening of the concave mirror, and one of the rotation stop positions of the air control baffle is set so as to guide the cooling air toward a top of the light source lamp depending on the installation posture of the projection display device.

6. The projection display device according to claim 4, wherein the air control baffle is rotatable around the rotation axis by the action of gravity.

7. The projection display device according to claim 1, wherein the branch switching valve is rotated by the action of gravity to switch between the flow paths.

8. The projection display device according to claim 1, further comprising a driving circuit that rotates the branch switching valve, wherein the driving circuit rotates the branch switching valve to switch between the flow paths based on information on an angle at which the projection display device is installed.

9. The projection display device according to claim 7, wherein the branch switching valve is symmetrical with respect to a rotation axis and has a weight portion located at a position away from the rotation axis.

10. The projection display device according to claim 1, wherein the branch switching valve is provided with respect to each of the flow paths leading to each of the air blowing ports.

11. The projection display device according to claim 1, wherein the air blowing ports are disposed in the circumferential portion of the concave mirror or the connecting part at positions corresponding to at least four directions in which they are orthogonal to each other with the lamp axis as a center, the air duct is divided into two branch flow paths, between which the branch switching valve switches so as to allow the cooling air supplied by the blowing fan to flow therethrough, the control valves include first and second control valves disposed in the respective branch flow paths to be switched therebetween, and the cooling air is blown through one of the air blowing ports depending on the posture of the light source cooling unit.

12. The projection display device according to claim 11, wherein the air duct, in the downstream after being switched by the branch switching valve to one of the branch flow paths in two directions, is formed so as to surround the concave mirror or the connecting part in a circumferential direction, and each of the branch flow paths includes at least two flow paths leading to the air blowing ports disposed in the circumferential direction, and at least one of the flow paths is switched between a mode of blowing the cooling air and a mode of stopping the cooling air by the first control valve or the second control valve.

13. The projection display device according to claim 12, wherein the first control valve or the second control valve is rotated around the rotation axis in the air duct by the action of gravity so that the cooling air is guided to the air blowing port that is located at the top, among the air blowing ports disposed in the circumferential direction of the concave mirror or the connecting part, when the projection display device is installed.

14. The projection display device according to claim 12, wherein the first control valve or the second control valve has a configuration in which a shield the air control baffle is provided on both sides of the rotation axis such that the center of gravity is located to the air blowing port side relative to the rotation axis.

15. The projection display device according to claim 11, wherein the branch switching valve is provided at a portion where the one air duct is divided into the two branch flow paths, and moves in the air duct by the action of gravity to block or open one of the branch flow paths.

16. The projection display device according to claim 14, wherein the branch switching valve has a columnar or spherical shape.

17. The projection display device according to claim 11, wherein the branch switching valve is provided at a portion where the one air duct is divided into the two branch flow paths, and has a cantilever shape with the air control baffle provided on one side of a rotation axis, so as to be rotated in the air duct by the action of gravity to block or open one of the branch flow paths.

18. The projection display device according to claim 11, wherein each of the air blowing ports has an air guide plate that guides air toward the discharge lamp.

19. The projection display device according to claim 1,
wherein the air blowing ports are disposed in the circumferential portion of the concave mirror or the connecting part at positions corresponding to at least four directions in which they are orthogonal to each other with the lamp axis as a center,
the air duct is divided into two branch flow paths, and the branch switching valve is formed of first and second branch switching valves, each being rotated around a supporting axis by the action of gravity to switch between the two branch flow paths so as to allow the cooling air supplied by the blowing fan to flow therethrough, and
the control valves include first and second control valves disposed in the respective branch flow paths to be switched therebetween.

20. The projection display device according to claim 19, wherein the first and second branch switching valves are provided at a portion where the one air duct is divided into the two branch flow paths, and disposed on the respective branch flow path sides with a rotation stopper provided therebetween, each having a cantilever shape with a shield plate provided on one side of a supporting axis, so as to be rotated in the air duct by the action of gravity to block or open the branch flow path where it is disposed.

\* \* \* \* \*